(12) United States Patent
Unagami et al.

(10) Patent No.: US 11,960,503 B2
(45) Date of Patent: Apr. 16, 2024

(54) DATA MANAGEMENT METHOD, DATA MANAGEMENT SYSTEM, AND RECORDING MEDIUM

(71) Applicant: Panasonic Intellectual Property Corporation of America, Torrance, CA (US)

(72) Inventors: Yuji Unagami, Osaka (JP); Junichiro Soeda, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 534 days.

(21) Appl. No.: 17/159,484

(22) Filed: Jan. 27, 2021

(65) Prior Publication Data
US 2021/0149917 A1    May 20, 2021

Related U.S. Application Data

(63) Continuation of application No. PCT/JP2019/048189, filed on Dec. 10, 2019.
(Continued)

(51) Int. Cl.
*G06F 16/27* (2019.01)
*G06F 16/23* (2019.01)
(Continued)

(52) U.S. Cl.
CPC ........ *G06F 16/275* (2019.01); *G06F 16/2308* (2019.01); *G06Q 50/06* (2013.01); *H04L 9/3213* (2013.01); *H04L 9/50* (2022.05)

(58) Field of Classification Search
CPC .... G06F 16/25; G06F 16/275; G06F 16/2308; G06Q 50/06; H04L 9/3213; H04L 9/50
(Continued)

(56) References Cited

U.S. PATENT DOCUMENTS

2010/0211812 A1* 8/2010 Bullen .................... H02J 7/35
                                                              713/340
2016/0284033 A1* 9/2016 Winand ............... G06Q 20/127
(Continued)

FOREIGN PATENT DOCUMENTS

| GB | 2531828 | 5/2016 |
|---|---|---|
| JP | 2018-112827 | 7/2018 |
| JP | 2018-128723 | 8/2018 |

OTHER PUBLICATIONS

Extended European Search Report dated Dec. 22, 2021 in corresponding European Patent Application No. 198969297.
(Continued)

*Primary Examiner* — Shahid A Alam
(74) *Attorney, Agent, or Firm* — Wenderoth, Lind & Ponack, L.L.P.

(57) ABSTRACT

A data management method performed by a first authentication server included in a plurality of authentication servers each having a distributed ledger in a data management system including a device and the plurality of authentication servers includes: obtaining first transaction data generated by the device and including device data obtained or generated by the device; and generating a block including the first transaction data and recording the generated block in the distributed ledger, when the device data included in the first transaction data is first data indicated in an information type list which is a data list indicating data that is subject to recording in the distributed ledger and related to a predetermined contract.

13 Claims, 13 Drawing Sheets

Related U.S. Application Data

(60) Provisional application No. 62/777,908, filed on Dec. 11, 2018.

(51) Int. Cl.
*G06Q 50/06* (2012.01)
*H04L 9/32* (2006.01)
*H04L 9/00* (2022.01)

(58) Field of Classification Search
USPC .......................................................... 707/634
See application file for complete search history.

(56) References Cited

U.S. PATENT DOCUMENTS

| | | | |
|---|---|---|---|
| 2018/0336286 A1* | 11/2018 | Shah | G06F 16/90332 |
| 2019/0036678 A1* | 1/2019 | Ahmed | H04L 9/008 |
| 2019/0165930 A1* | 5/2019 | Castinado | H04L 9/3239 |
| 2019/0207750 A1* | 7/2019 | Harvey | H04L 9/0643 |
| 2019/0295193 A1* | 9/2019 | Winand | G06Q 20/38215 |
| 2019/0304038 A1* | 10/2019 | Purushothaman | G06F 16/29 |
| 2020/0021439 A1 | 1/2020 | Sato | |

OTHER PUBLICATIONS

Hou et al., "Applying the blockchain technology to promote the development of distributed photovoltaic in China", International Journal of Energy Research, 2018, vol. 42, pp. 2050-2069, XP055592934.

International Search Report dated Feb. 4, 2020 in In International (PCT) Application No. PCT/JP2019/048189.

Dylan Yaga et. Al, "Blockchain Technology Overview", National Institute of Standards and Technology, https://nleubs.nist.gov/nistpubs/ir/2018/NIST.IR.8202.pdf, Oct. 2018.

Office Action issued Jan. 22, 2024 in corresponding European Patent Application No. 19896929.7.

Anonymous: "Combination of off-chain with blockchain storage", Oct. 14, 2018, pp. 1-2, XP093119723, Retrieved from the Internet: URL: https://www.mn.unio.no/ifi/studier/masteroppgaver/nd/combination-of-off-chain-with-blockchain-storage.html [retrieved on Jan. 15, 2024].

* cited by examiner

| CONTRACT TYPE | IN-HOME DEVICE | INFORMATION TYPE |
|---|---|---|
| POWER SAVING | POWER METER | POWER INFORMATION |
| | STORAGE BATTERY | AMOUNT OF CHARGE POWER DISCHARGE INFORMATION |
| | PHOTOVOLTAIC EQUIPMENT | POWER GENERATION AMOUNT INFORMATION |
| POWER TRADING | POWER METER | POWER INFORMATION |
| ... | | |

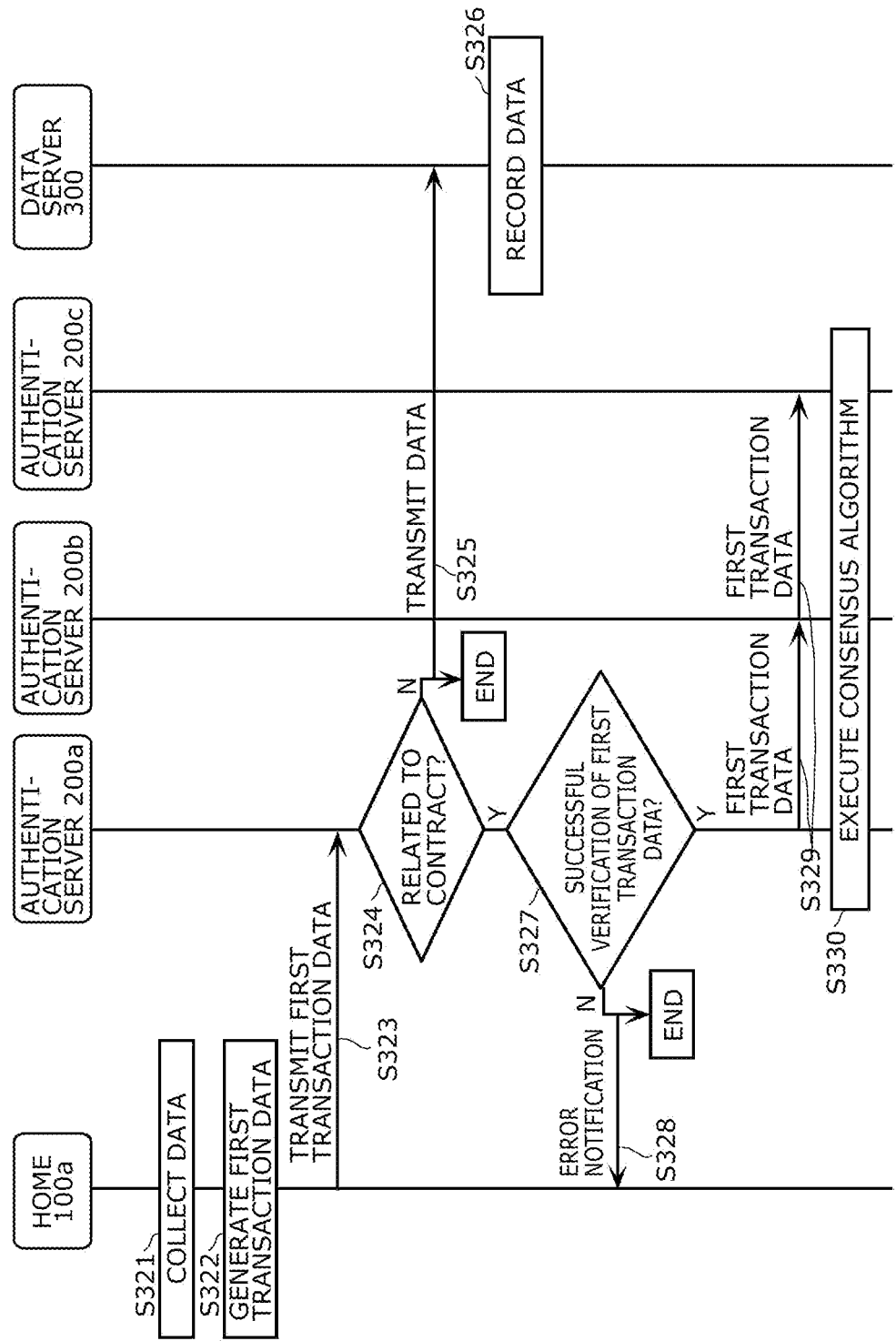

DATA MANAGEMENT METHOD, DATA MANAGEMENT SYSTEM, AND RECORDING MEDIUM

CROSS REFERENCE TO RELATED APPLICATIONS

This is a continuation application of PCT International Application No. PCT/JP2019/048189 filed on Dec. 10, 2019, designating the United States of America, which is based on and claims priority of U.S. Provisional Patent Application No. 62/777,908 filed on Dec. 11, 2018. The entire disclosures of the above-identified applications, including the specifications, drawings and claims are incorporated herein by reference in their entirety.

FIELD

The present disclosure relates to data management methods, data management systems, and recording media, and particularly relates to a data management method, a data management system, and a recording medium by which data collected from a user is managed.

BACKGROUND

In recent years, systems for collecting, analyzing, and circulating data such as user data and device data have been researched. Future development of internet of things (IoT) and prevalence of artificial intelligence (AI), etc., will make it possible to collect more data than ever, and therefore there is a demand for utilization of the collected data.

However, if the collected data is tampered with, this would hinder the data utilization. For example, if data to be used in AI learning is tampered with, incorrect learning would be performed and could end up causing an AI system to perform a faulty process. Furthermore, in the case where IoT devices operate in conjunction by way of communication, if sensor information or the like is tampered with, the IoT devices would become unable to operate in conjunction.

Therefore, it is necessary to prevent the collected data from being tampered with. For example, Non Patent Literature (NPL) 1 discloses that the use of blockchains makes database tampering difficult. According to NPL 1, by managing data, for example, in a database using the blockchains, it is possible to prevent collected data from being tampered with.

CITATION LIST

Non Patent Literature

NPL 1: [NPL 1] NISTIR 8202 Blockchain Technology Overview (https://nvpubs.nist.gov/nistpubs/ir/2018/NIST.IR.8202.pdf retrieved on Nov. 21, 2018)

SUMMARY

Technical Problem

However, it is difficult to manage the entire IoT data using blockchains. For example, in the case of managing the entire IoT data using blockchains, there may be a shortage of storage capacity due to an enormous amount of data to be managed. Moreover, since block generation requires time, even when real-time data utilization is necessary, there may be a delay, or when a large amount of transaction data incudes data necessary for the linkage between devices, the linkage may not be successful due to the necessary data not being quickly included in a block. Thus, the difficulty of managing the entire IoT data using blockchains is problematic.

The present disclosure is conceived in view of the above-described circumstances and has as an object to provide a data management method and the like by which only necessary data can be managed using the blockchain technology.

Solution to Problem

In order to achieve the aforementioned object, a data management method according to the present disclosure is performed by a first authentication server included in a plurality of authentication servers each having a distributed ledger in a data management system including a device and the plurality of authentication servers. The data management method includes: obtaining first transaction data generated by the device and including device data obtained or generated by the device; and generating a block including the first transaction data and recording, in the distributed ledger, the block generated, when the device data included in the first transaction data is first data indicated in an information type list which is a data list indicating data that is subject to recording in the distributed ledger and related to a predetermined contract.

Note that these general and specific aspects may be implemented using a system, an integrated circuit, a computer program, or a computer-readable recording medium such as a compact disc read-only memory (CD-ROM), or any combination of systems, methods, integrated circuits, computer programs, or recording media.

Advantageous Effects

According to the present disclosure, only necessary data can be managed using the blockchain technology. This makes it possible to construct a system that is safe and efficient for data utilization.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 14 is a sequence chart for describing an example according to a variation of details of a data registration process indicated in Step S300 in FIG. 9.

DESCRIPTION OF EMBODIMENTS

Figure 1:
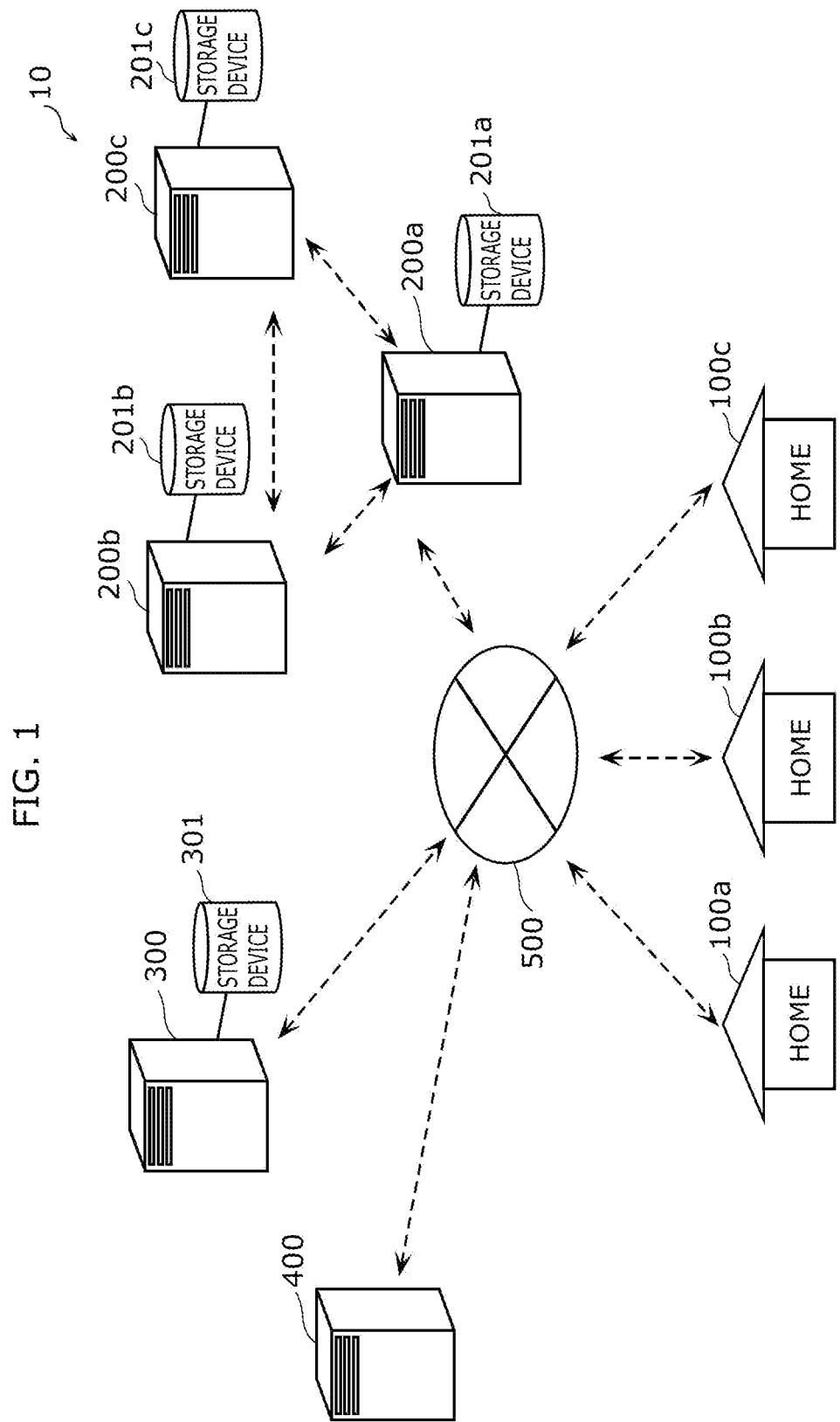
FIG. 1 is a diagram illustrating one example of the overall configuration of a data management system according to an embodiment.

A data management method according to one aspect of the present disclosure is performed by a first authentication server included in a plurality of authentication servers each having a distributed ledger in a data management system including a device and the plurality of authentication servers. The data management method includes: obtaining first transaction data generated by the device and including device data obtained or generated by the device; and generating a block including the first transaction data and recording, in the distributed ledger, the block generated, when the device data included in the first transaction data is first data indicated in an information type list which is a data list indicating data that is subject to recording in the distributed ledger and related to a predetermined contract.

With this, a data management method for managing only necessary data using the blockchain technology can be provided. Thus, it becomes possible to construct a system that is safe and efficient for data utilization.

Furthermore, the first authentication server may include the information type list. The data management method may further include: determining, with reference to the information type list, whether or not the device data included in the first transaction data obtained in the obtaining is the first data indicated in the information type list. In the generating of the block, when the device data included in the first transaction data is determined in the determining as being the first data indicated in the information type list, the block including the first transaction data may be generated.

Furthermore, the data management system may further include a data server. The data management method may further include: transmitting the device data to the data server to cause the data server to record the device data in a recording device included in the data server, when the device data included in the first transaction data is determined in the determining as not being the first data indicated in the Information type list.

Furthermore, the device may include the information type list. The data management method may further include: determining, by the device with reference to the information type list, whether or not the data obtained or generated by the device is the first data indicated in the information type list; and generating the first transaction data to include, as the device data, the data obtained or generated by the device, and transmitting the first transaction data to the first authentication server, when the data obtained or generated by the device is determined in the determining by the device as being the first data indicated in the information type list. In the obtaining, the first transaction data transmitted in the generating of the first transaction data may be obtained.

Furthermore, the data management system may further include a data server. The data management method may further include: transmitting the data obtained or generated by the device to the data server by the device to cause the data server to record the data obtained or generated by the device in a recording device included in the data server, when the data obtained or generated by the device is determined by the device in the determining by the device as not being the first data indicated in the information type list.

Furthermore, the data management system may further include a service server. The data management method may further include: generating, by the service server, a smart contract for confirming formation of a contract between the service server and the device, including the smart contract into second transaction data, and transmitting the second transaction data from the service server to the first authentication server. In the generating of the block, a block including the second transaction data transmitted in the generating of the smart contract may be generated, and the block generated may be recorded in the distributed ledger.

Furthermore, in the obtaining, third transaction data generated by the device and indicating the formation of the contract between the service server and the device may be obtained. In the generating of the block, a block including the third transaction data obtained in the obtaining may be generated, and the block generated may be recorded in the distributed ledger. The data management method may further include: adding data related to the contract formed between the service server and the device to the information type list by operating the smart contract based on the third transaction data included in the block recorded in the distributed ledger.

Furthermore, the data management method may further include: issuing a token to the device by operating the smart contract based on the first transaction data, when the block including the first transaction data is recorded in the distributed ledger in the generating of the block.

Furthermore, the predetermined contract may be related to electric power, and the device data may be related to electric power.

Furthermore, the predetermined contract may be a contract related to linkage between a first device and a second device that are different from the device, and the device data may be data about a status of the second device after completion of an operation of the first device.

Furthermore, the first device may be a robot that operates in a first process, and the second device may be a robot that operates after the first process.

Furthermore, a data management system according to one aspect of the present disclosure includes: a plurality of authentication servers each having a distributed ledger; and a device. A first authentication server included in the plurality of authentication servers includes: an obtainer that obtains first transaction data generated by the device and including device data obtained or generated by the device; a transaction data verifier that verifies the first transaction data when the device data included in the first transaction data is first data indicated in an information type list which is a data list indicating data that is subject to recording in the distributed ledger and related to a predetermined contract; and a synchronizer that generates a block including the first transaction data and records, in the distributed ledger, the block generated.

Hereinafter, an embodiment will be described with reference to the drawings. Note that each embodiment described below shows a specific example of the present disclosure. Thus, the numerical values, shapes, materials, structural elements, and the arrangement and connection of the structural elements, etc., shown in the following embodiment are mere examples, and are not intended to limit the present disclosure. As such, among the structural elements in the following embodiment, structural elements not recited in any one of the independent claims which indicates a form of implementation according to one aspect of the present disclosure will be described as arbitrary structural elements. The form of implementation of the present disclosure is not limited to the original independent claims and may be expressed by other independent claims.

EMBODIMENT

First, the system configuration of the present disclosure will be described.

1. System Configuration

A data management system according to the present disclosure records, out of data obtained or generated by a device, only data related to a predetermined contract in a distributed ledger as necessary data. This allows the data management system according to the present disclosure to manage only necessary data using the blockchain technology.

Hereinafter, a data management system, etc., according to an embodiment will be described with reference to the drawings.

1.1 Overall Configuration of Data Management System 10

FIG. 1 is a diagram illustrating one example of the overall configuration of data management system 10 according to the present embodiment.

As illustrated in FIG. 1, data management system 10 incudes homes 100a, 100b, 100c, authentication server 200a, 200b, 200c, data server 300, and service server 400, for example. These are connected by communication network 500. Note that in the following description, there are cases where home 100 is used as a term representing homes 100a, 100b, 100c.

Furthermore, authentication servers 200a, 200b, 200c (which hereinafter authentication server 200 represents as necessary) are connected to storage devices 201a, 201b 201c (which hereinafter storage device 201 represents as necessary). Authentication server 200 may be connected to storage device 201 via communication network 500 or may include storage device 201 therein. Storage device 201 has a distributed ledger in which transaction data and blocks of blockchains are electronically recorded.

Although FIG. 1 illustrates an example in which data management system 10 includes three authentication servers 200, one data server 300, and one service server 400, this is not limiting.

For example, data management system 10 may include four or more authentication servers or is not required to include service server 400.

1.2 Configuration of Home 100a

Since homes 100a, 100b, 100c have substantially the same configurations, the configuration of home 100a will be described below as a representative.

Figure 2:
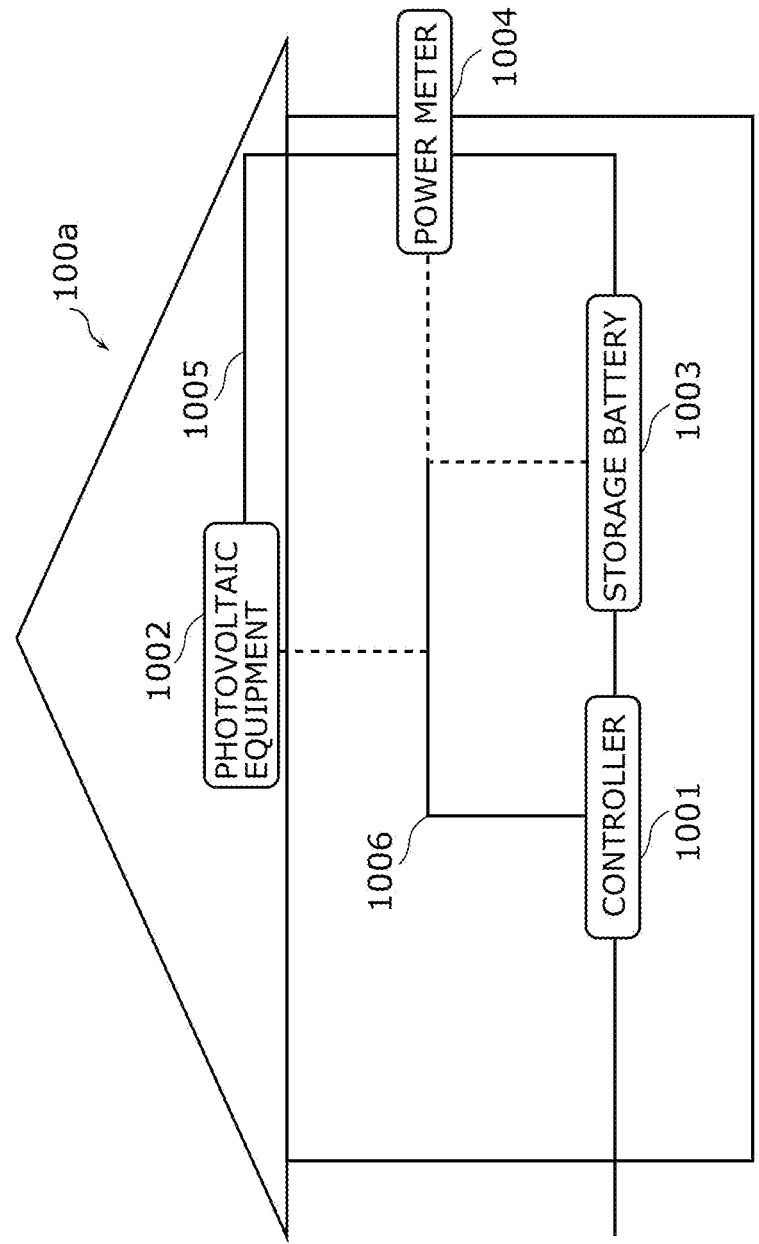
FIG. 2 is a diagram illustrating one example of the overall configuration of a home according to an embodiment.

FIG. 2 is a diagram illustrating one example of the overall configuration of home 100a according to the present embodiment.

As illustrated in FIG. 2, home 100a includes controller 1001, photovoltaic equipment 1002, storage battery 1003, and power meter 1004. Controller 1001, photovoltaic equipment 1002, storage battery 1003, and power meter 1004 are connected by communication network 1006. Furthermore, photovoltaic equipment 1002, storage battery 1003, and power meter 1004 are connected by power network 1005. Power network 1005 may be connected to an external power network. Note that home 100a is, for example, a house such as a residential house, but this is not limiting. Home 100a may be an architectural structure such as a factory and a building. In other words, the form of home 100a is not limited as long as home 100a is an architectural structure that is used by a user. In the following description, a device located inside home 100a will be referred to as a device in the home (hereinafter, in-home device). The in-home device may or may not include photovoltaic equipment 1002, storage battery 1003, and power meter 1004. In the case where home 100a is a factory, the in-home device includes a robot.

<Controller 1001>

Controller 1001 is one example of the device according to the present disclosure. Controller 1001 is, for example, for an energy management system. In the present embodiment, controller 1001 operates the in-home device or the like and receives and displays the state of the in-home device that includes the power generation status of photovoltaic equipment 1002 or the power storage status of storage battery 1003, for example. Furthermore, when controller 1001 operates the in-home device or the like, controller 1001 receives, from the in-home device, data indicating a change in the state of the in-home device. Moreover, when a demand response program is accepted, controller 1001 reduces power usage, and when a power trade offer is accepted, controller 1001 transmits electric power to an external power network (not illustrated in the drawings) via power meter 1004, for example.

Furthermore, controller 1001 provides, to a user, information about a predetermined contract such as power saving or power trading between homes, and generates transaction data under an agreement with the user. Moreover, controller 1001 obtains data such as an operation history of the in-home device, sensor information, and power information and transmits the data to data server 300, and generates transaction data including information about a contract and transmits the transaction data to authentication server 200, for example. The information about the contract, which will be described in detail later, is, for example, data indicating power transmission information based on power trading or usage from the storage battery based on power saving.

<Photovoltaic Equipment 1002>

Photovoltaic equipment 1002 is a device or the like with a power generation system that directly converts sunlight into electric power using a solar cell. Photovoltaic equipment 1002 stores the generated electric power into storage battery 1003 via power network 1005 or transmits the generated electric power to the external power network, for example.

<Storage Battery 1003>

Storage battery 1003 stores the electric power generated by photovoltaic equipment 1002. Storage battery 1003 transmits the stored electric power to the external power network via power network 1005 according to an instruction from controller 1001, for example. Furthermore, storage battery 1003 may store electric power received from the external power network via power network 1005 according to an instruction from controller 1001, for example. Note that storage battery 1003 is not an essential element and is not required to be included in home 100a.

<Power Meter 1004>

Power meter 1004 measures the amount of electric power that is transmitted to the external power network or the amount of electric power that is received from the external power network. When photovoltaic equipment 1002 or storage battery 1003 transmits electric power to the external power network, power meter 1004 measures time at which photovoltaic equipment 1002 or storage battery 1003 transmits the electric power and the amount of the electric power transmitted by photovoltaic equipment 1002 or storage battery 1003, and notifies controller 1001 of the measurement results, according to an instruction from controller 1001. According to an instruction from controller 1001, power meter 1004 measures the electric power received from the external power network or the electric power used by the in-home device.

Next, one example of the configuration of controller 1001 will be described.

1.3 Configuration of Controller 1001

Figures 3, 4:
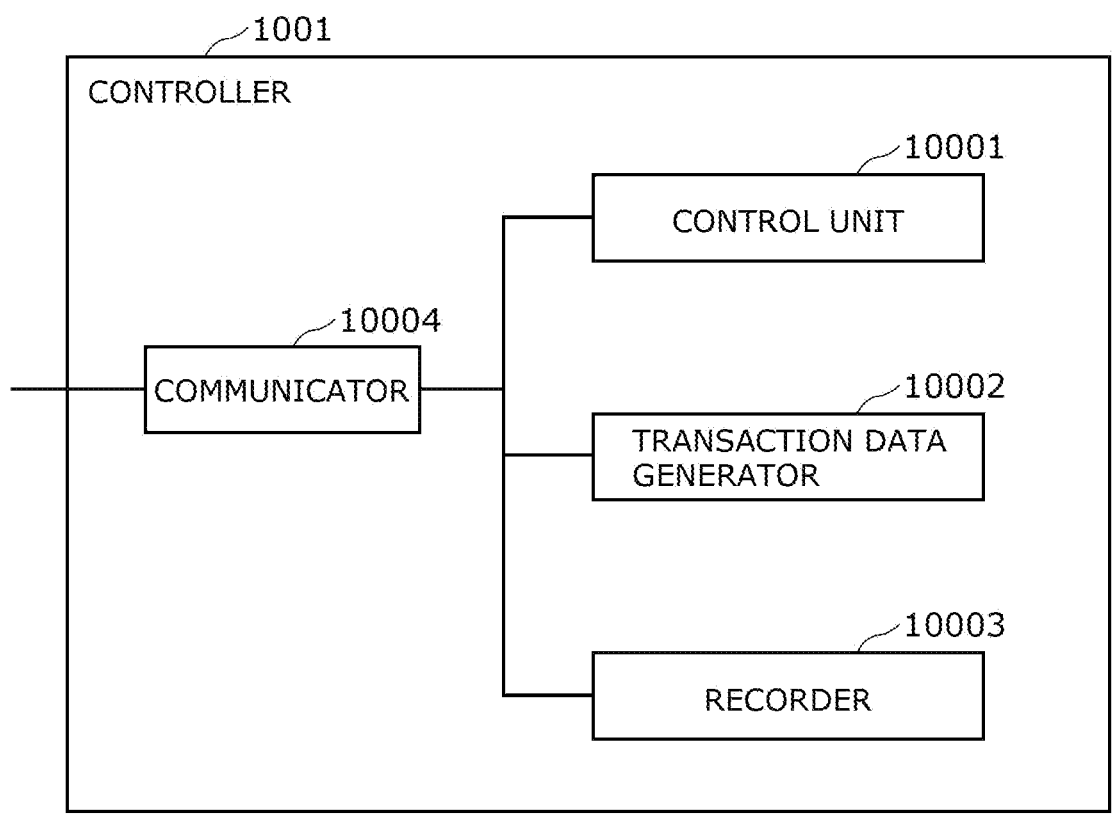
FIG. 3 is a block diagram illustrating one example of the functional configuration of a controller illustrated in FIG. 2.
FIG. 4 is a diagram illustrating one example of an information type list according to an embodiment.

FIG. 3 is a block diagram illustrating one example of the functional configuration of controller 1001 illustrated in FIG. 2. Controller 1001 includes a processor and a memory in which a program for causing the processor to execute a predetermined process is stored. This means that controller 1001 is implemented by the processor executing a predetermined program using the memory. In the present embodiment, controller 1001 includes control unit 10001, transaction data generator 10002, recorder 10003, and communicator 10004, as illustrated in FIG. 3.

<Control Unit 10001>

When control unit 10001 obtains or generates data, control unit 10001 determines, with reference to an information type list, whether or not said data is first data indicated in the information type list. When control unit 10001 determines that said data is the first data indicated in the information type list, control unit 10001 requests transaction data generator 10002 to generate first transaction data including said data as device data. Note that when control unit 10001 determines that said data is not the first data indicated in the information type list, control unit 10001 transmits said data to data server 300 via communicator 10004.

In the present embodiment, when control unit 10001 operates the in-home device, control unit 10001 receives, from the in-home device, data indicating a change in the state of the in-home device. The received data includes sensor information or device information indicating the state of the in-home device, for example. Furthermore, when control unit 10001 operates the in-home device, control unit 10001 generates data including history information or an operation history of the in-home device.

When control unit 10001 generates or obtains such data, control unit 10001 determines, with reference to the information type list, whether or not said data is information (data) about a predetermined contract. When control unit 10001 determines that said data is the information about the predetermined contract, control unit 10001 requests transaction data generator 10002 to generate transaction data including said data as the device data.

Here, the information type list is a data list indicating data that is subject to recording in the distributed ledger of storage device 201a and is related to a predetermined contract. The information type list is referred to by control unit 10001 and is used to determine whether or not the data obtained or generated by control unit 10001 is the information about the contract. The information type list may be provided from service server 400 and recorded in recorder 10003, for example.

FIG. 4 is a diagram illustrating one example of the information type list according to the present embodiment.

The information type list includes items of a contract type, an in-home device, and an information type, as illustrated in FIG. 4, for example. The contract type indicates the predetermined contract; in the example illustrated in FIG. 4, a power saving contract and a power trading contract are indicated. The in-home device indicates a device in the home (inside home 100) that is determined for each contract type and generates or holds data subject to recording in the distributed ledger. The information type indicates information that is determined for each device and subject to recording in the distributed ledger.

For example, assume that a power saving contract has been formed as the contract type. In this case, control unit 10001 refers to the information type list and transmits the power information of the power meter, the amount of charge and the power discharge information of the storage battery, and the power generation amount information of the photovoltaic equipment to transaction data generator 10002 so as to generate transaction data including these data. As a result, the transaction data including these data is transmitted to authentication server 200 and recorded in the distributed ledger of storage device 201 included in authentication server 200.

Note that the information type list may be assigned time information for each information type. Specifically, the information type list may include, as the time information, the frequency or the time interval of generation of the transaction data. According to the time information for each information type, control unit 10001 may obtain data from a target in-home device and transmit the data to transaction data generator 10002 so that transaction data including the obtained data is generated.

Furthermore, the information type list may be held in controller 1001 or may be held in authentication server 200. In the case where the information type list is held in authentication server 200, control unit 10001 may make a query to authentication server 200 regularly or irregularly and generate and obtain data of the target in-home device.

Note that when control unit 10001 determines that said data is not the information about the predetermined contract, control unit 10001 transmits said data to data server 300. Control unit 10001 may transmit, to transaction data generator 10002, the data determined as not being the information about the predetermined contract, to transmit said data to data server 300.

<Transaction Data Generator 10002>

When transaction data generator 10002 receives, from control unit 10001, data of the in-home device related to the contract, namely, the device data, transaction data generator 10002 generates transaction data including the received device data.

In the present embodiment, transaction data generator 10002 calculates a hash value of the device data received from control unit 10001 and generates transaction data including the device data and the calculated hash value. More specifically, transaction data generator 10002 generates transaction data including: a blockchain address which is an identifier for identifying a user or controller 1001; the device data; the hash value of the device data; and a signature. Here, the signature is generated using a signature generation key unique to each user. Furthermore, the transaction data may be assigned an identifier for identifying said transaction data.

Transaction data generator 10002 records the generated transaction data in recorder 10003 and transmits the generated transaction data to authentication server 200 via communicator 10004.

Note that when transaction data generator 10002 receives, from control unit 10001, data that is not the information about the contract, transaction data generator 10002 may generate transaction data including said data and transmit the transaction data to data server 300 via communicator 10004.

<Recorder 10003>

Recorder 10003 records the transaction data generated by transaction data generator 10002. Furthermore, recorder 10003 recodes the information of the service, the information about the contract, and the information type list received from service server 400. Furthermore, recorder 10003 may record data exchanged inside home 100a (in the home).

<Communicator 10004>

Communicator 10004 communicates with authentication server 200, data server 300, and service server 400 via communication network 500. This communication may be performed using transport layer security (TLS). In this case, a cryptographic key for TLS communication may be held in communicator 10004.

Next, authentication server 200a, etc., will be described.

1.4 Configuration of Authentication Server 200a

Since authentication servers 200a, 200b, 200c have substantially the same configurations, the configuration of authentication server 200a will be described below as a representative.

Figure 5:
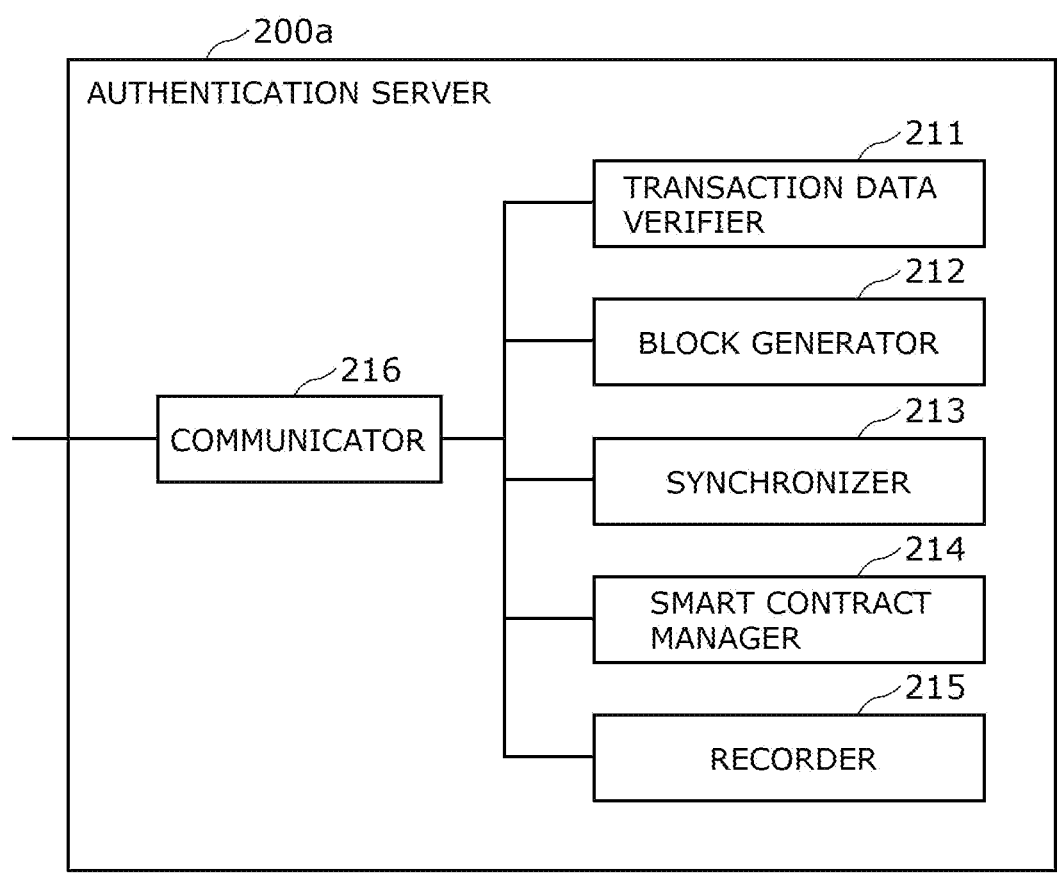
FIG. 5 is a block diagram illustrating one example of the functional configuration of an authentication server according to an embodiment.

FIG. 5 is a block diagram illustrating one example of the functional configuration of authentication server 200a according to the present embodiment. As illustrated in FIG. 5, authentication server 200a includes transaction data verifier 211, block generator 212, synchronizer 213, smart contract manager 214, recorder 215, and communicator 216. Note that transaction data verifier 211 is not essential. Authentication server 200a can be implemented by a processor executing a predetermined program using a memory. The following describes structural elements.

<Transaction Data Verifier 211>

Transaction data verifier 211 verifies the received transaction data. More specifically, when the device data included in the received first transaction data is first data that is data subject to recording in the distributed ledger and indicated in the information type list, transaction data verifier 211 verifies the first transaction data.

In the present embodiment, when transaction data verifier 211 receives transaction data including the device data from home 100, transaction data verifier 211 verifies whether or not the address, the device data, and the signature included in the transaction data are valid. Similarly, when transaction data verifier 211 receives transaction data including the smart contract from service server 400, transaction data verifier 211 verifies whether or not the address, the smart contract, and the signature included in the transaction data are valid. Here, the smart contract is a program for confirming formation of a contract between service server 400 and controller 1001 of home 100, for example. Similarly, when transaction data verifier 211 receives, from home 100, transaction data indicating the formation of the contract between service server 400 and controller 1001 of home 100, transaction data verifier 211 verifies whether or not the address, the signature, etc., included in the transaction data are valid.

In this manner, transaction data verifier 211 verifies the first transaction data to the third transaction data by confirming the validity of the received transaction data.

When transaction data verifier 211 confirms the validity of the transaction data as a result of the verification, transaction data verifier 211 records said transaction data in recorder 215 and notifies synchronizer 213 of said transaction data.

<Block Generator 212>

When the device data included in the received first transaction data is the first data that is data subject to recording in the distributed ledger and indicated in the information type list, block generator 212 generates a block including the first transaction data and records the generated block in the distributed ledger.

In the present embodiment, when transaction data verifier 211 successfully verifies the transaction data, block generator 212 generates a block including said transaction data and executes a consensus algorithm for the transaction data between two or more authentication servers. Here, block generator 212 may use, as the consensus algorithm, a consensus algorithm called practical byzantine fault tolerance (PBFT) or proof of work (PoW). Block generator 212 may use other known consensus algorithms.

Note that when authentication server 200a does not include transaction data verifier 211, it is sufficient that block generator 212 generate a block including the received transaction data and record the generated block in the distributed ledger.

In this manner, in the present embodiment, block generator 212 executes the consensus algorithm between authentication server 200a, authentication server 200b, and authentication server 200c. Specifically, first, block generator 212 generates a block of a blockchain including one or more pieces of transaction data. In the present embodiment, block generator 212 generates a block including the first transaction data, the second transaction data, or the third transaction data. Next, block generator 212 executes the consensus algorithm. When an agreement is made as a result of the execution of the consensus algorithm, block generator 212 records the generated block in recorder 215. The block generated by block generator 212 is connected to the blockchain and recorded by recorder 215.

Here, the data structure of the blockchain and the data structure of a portion of the transaction data included in the blockchain will be described.

Figure 6:
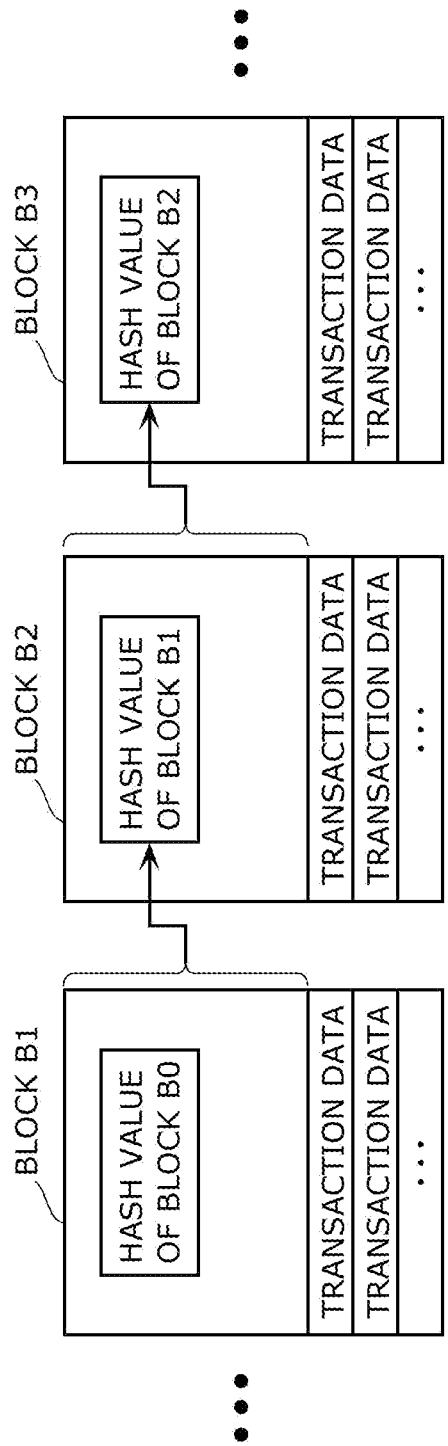
FIG. 6 is an explanatory diagram illustrating the data structure of a blockchain.

FIG. 6 is an explanatory diagram illustrating the data structure of the blockchain.

The blockchain includes blocks, each of which is a unit of recording, connected in the form of chains. Each of the blocks includes two or more pieces of the transaction data and the hash value of an immediately preceding block. Specifically, block B2 includes the hash value of block B1 located before block B2. Block B3 includes, as the hash value of block B2, a hash value calculated from the hash value of block B1 and the two or more pieces of the transaction data included in block B2. Thus, by connecting blocks in the form of chains while including the content of preceding blocks as the hash values, it is possible to effectively prevent connected transaction data from being tampered with. This is because a change in previous transaction data leads to a change in the hash value of the block to a value different from the original value, meaning that making a block that has been tampered with look like an authentic block requires modifying all the subsequent blocks, which is an unrealistically difficult task.

<Synchronizer 213>

Synchronizer 213 synchronizes the blocks of the blockchain or the transaction data between the authentication servers (authentication servers 200a to 200c).

Synchronizers 213 of the plurality of authentication servers 200a to 200c perform peer-to-peer synchronization on the transaction data in the blockchain. Subsequently, synchronizers 213 record, in recorders 215, the transaction data of the blockchain synchronized in the plurality of authentication servers 200a to 200c.

For example, when transaction data verifier 211 verifies the validity of the transaction data, synchronizer 213 transfers the verified transaction data to other authentication servers 200b, 200c and performs synchronization between the authentication servers (authentication servers 200a to 200c). Furthermore, synchronizer 213 temporarily records, in recorder 215, the verified transaction data received from other authentication servers 200b, 200c and performs synchronization between the authentication servers (authentication servers 200a to 200c).

<Smart Contract Manager 214>

Smart contract manager 214 operates the smart contract by executing the contract code, etc., of the smart contract stored in the distributed ledger of storage device 201a.

More specifically, assume that a block including transaction data having a contract code described therein (the third transaction data) is recorded in the distributed ledger of storage device 201a. In this case, on the basis of the third transaction data, smart contract manager 214 operates the smart contract stored in the distributed ledger of storage device 201a and thus adds, to the information type list, the data related to the contract formed between service server 400 and the device. Here, in the case where the information type list is held in a device such as controller 1001 of home 100, operating the smart contract causes the data related to said contract to be transmitted to said device and thus be added to the information type list. In the case where the information type list is recorded in recorder 215, operating the smart contract causes the data related to said contract to be added to the information type list recorded in recorder 215.

Furthermore, assume that a block including the first transaction data is recorded in the distributed ledger of storage device 201a. In this case, on the basis of the first transaction data, smart contract manager 214 operates the smart contract and thus issues a token to the device.

In other words, when a block including transaction data to which the contract address of the smart contract obtained from data server 300 and registered has been assigned is recorded in the distributed ledger of storage device 201a, smart contract manager 214 executes the smart contract. For example, assume that the smart contract obtained from data server 300 and registered stipulates that an incentive is to be paid to home 100 for use of electric power from the storage battery based on power saving. In this case, when a block including transaction data that indicates said use of the electric power and has been received from home 100 is recorded in the distributed ledger of storage device 201a, smart contract manager 214 executes the smart contract. The executed smart contract issues a token for paying the incentive to home 100 that has generated the transaction data recorded in the distributed ledger, for example.

<Recorder 215>

Recorder 215 records the transaction data and the blocks of the blockchain. More specifically, recorder 215 includes the transaction data into the blocks and records the blocks in the blockchain in the distributed ledger of storage device 201a. Storage device 201a may be provided inside recorder 215 or may be provided outside authentication server 200a as illustrated in FIG. 1.

In the present embodiment, recorder 215 records, in the distributed ledger of storage device 201a, the block generated to include the transaction data received from home 100a or the transaction data received from service server 400. Furthermore, recorder 215 may record, in the distributed ledger of storage device 201a, the block generated to include the third transaction data indicating formation of a contract between service server 400 and controller 1001 of home 100.

<Communicator 216>

Communicator 216 communicates with home 100, data server 300, and other authentication servers 200b, 200c via communication network 500. This communication may be performed using TLS. In this case, a cryptographic key for TLS communication may be held in communicator 216.

More specifically, communicator 216 obtains the first transaction data generated by a device such as controller 1001 of home 100 and including device data that is data obtained or generated by said device. Furthermore, communicator 216 obtains the second transaction data including the smart contract from service server 400. Moreover, communicator 216 obtains the third transaction data generated by the device and indicating formation of a contract between service server 400 and the device.

Next, data server 300 will be described.

1.5 Configuration of Data Server 300

Data server 300 is connected to storage device (recording device) 301. Data server 300 is described as including storage device 301 therein, but may be connected to storage device 301 via communication network 500.

Figure 7:
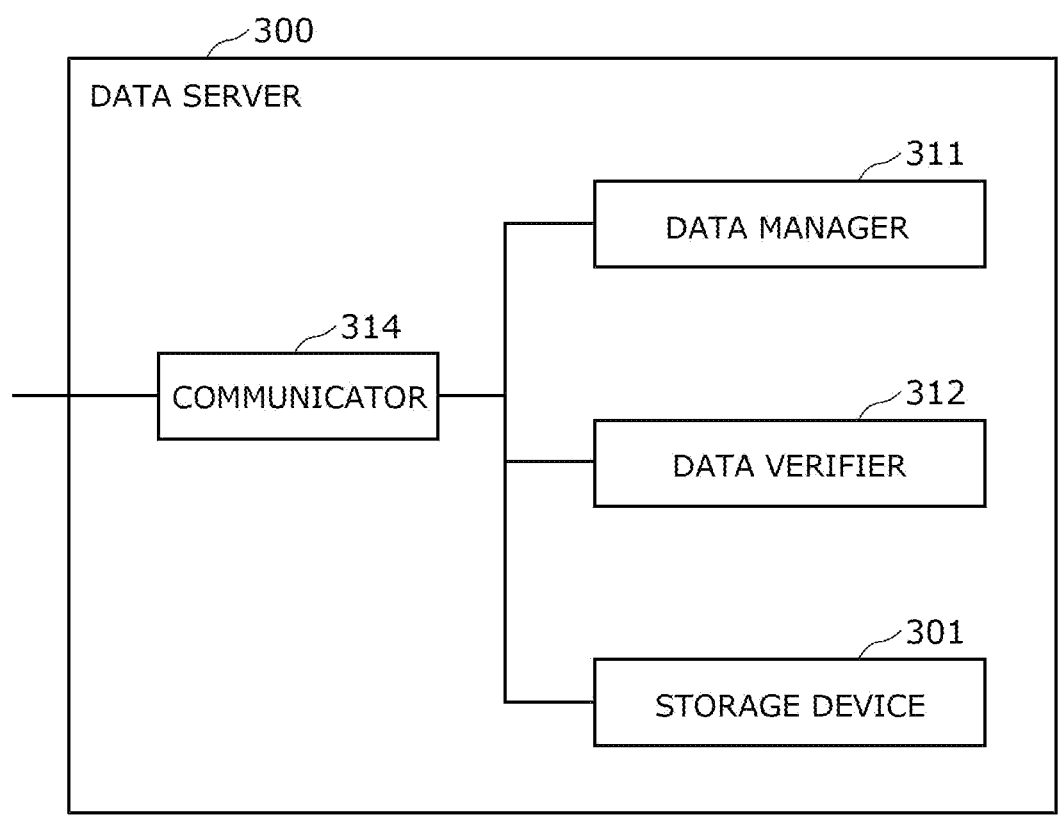
FIG. 7 is a block diagram illustrating one example of the functional configuration of a data server according to an embodiment.

FIG. 7 is a block diagram illustrating one example of the functional configuration of data server 300 according to the present embodiment. As illustrated in FIG. 7, data server 300 includes storage device 301, data manager 311, data verifier 312, and communicator 314. Data server 300 can be implemented by a processor executing a predetermined program using a memory. The following describes structural elements.

<Data Manager 311>

Data manager 311 records, in storage device 301, data received from home 100. More specifically, data manager 311 records, in storage device 301, data obtained or generated by a device such as controller 1001 of home 100 and received from home 100.

Furthermore, when a request to provide the data is received from authentication server 200 or service server 400, data manager 311 provides the data recorded in storage device 301.

<Data Verifier 312>

Data verifier 312 verifies whether or not the data recorded in storage device 301 has been tampered with. In the present embodiment, data verifier 312 calculates the hash value of the data received from home 100 and records the hash value in storage device 301 together with said data, for example. Thus, by calculating the hash value of the data recorded in storage device 301 and comparing the calculated hash value with the hash value recorded in storage device 301, data verifier 312 can verify whether or not the data recorded in storage device 301 has been tampered with.

<Storage Device 301>

Storage device 301 records data obtained or generated by a device such as controller 1001 of home 100 and received from home 100. Storage device 301 is, for example, a hard disk driver (HDD) or the like.

<Communicator 314>

Communicator 314 communicates with home 100, authentication server 200, and service server 400 via communication network 500. This communication may be performed using TLS.

In this case, a cryptographic key for TLS communication may be held in communicator 314.

Next, service server 400 will be described.

1.6 Configuration of Service Server 400

Figure 8:
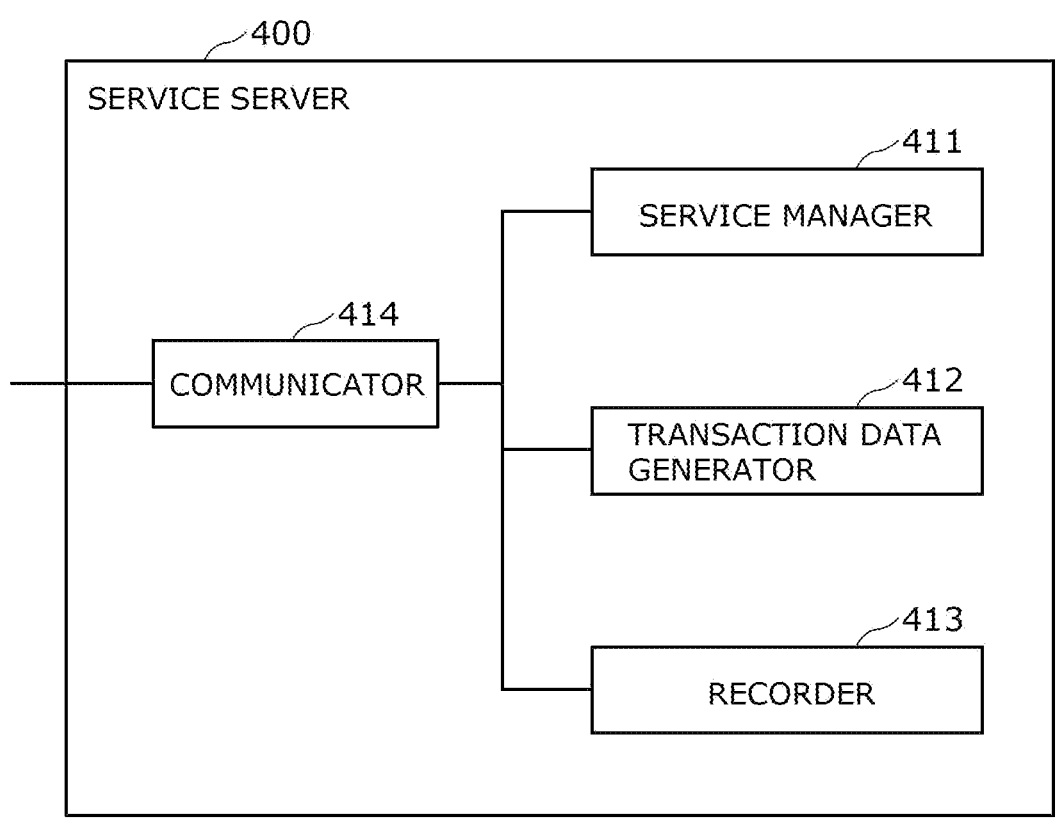
FIG. 8 is a block diagram illustrating one example of the functional configuration of a service server according to an embodiment.
Figure 10:
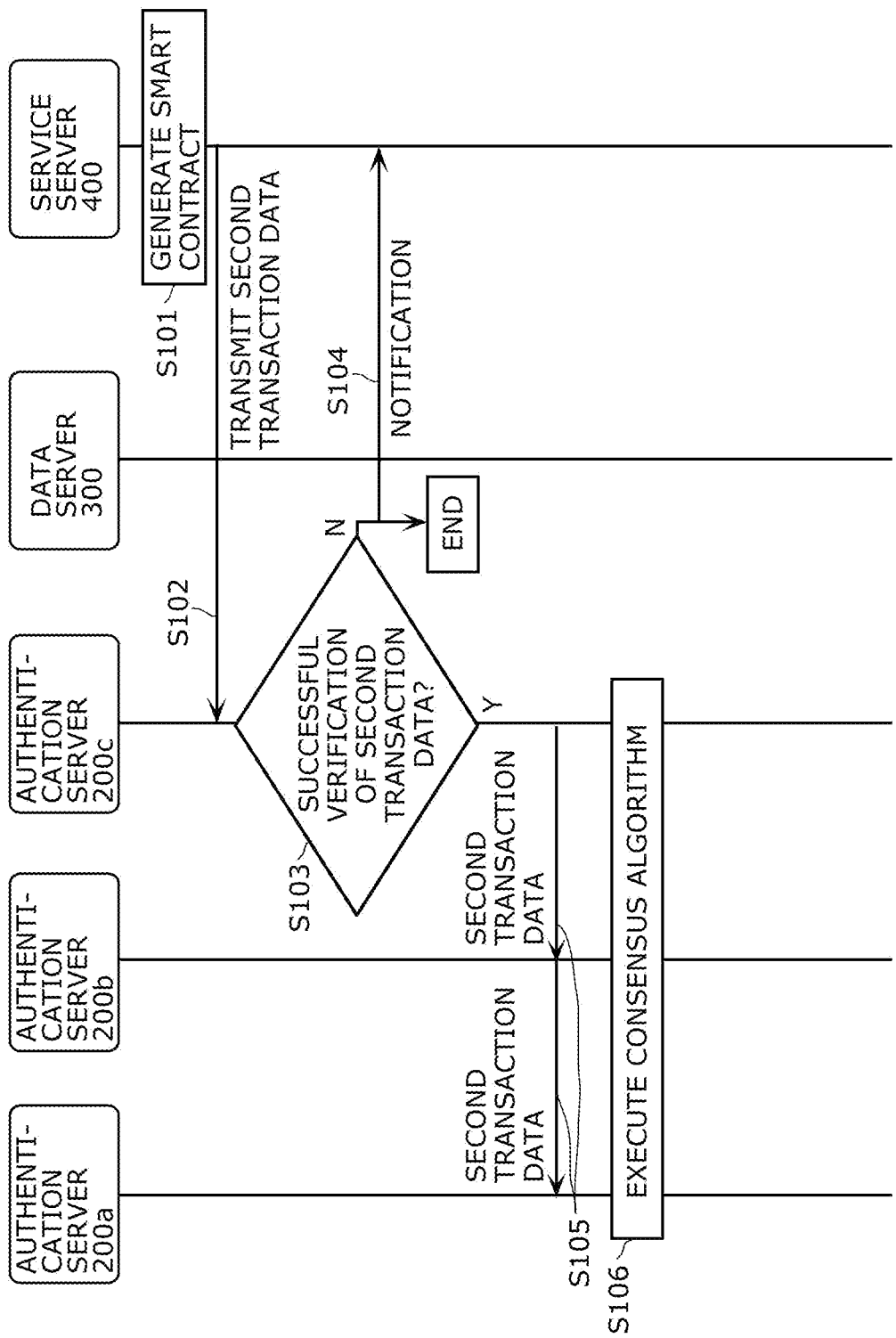
FIG. 10 is a sequence chart for describing details of a smart contract registration process indicated in Step S100 in FIG. 9.

FIG. 8 is a block diagram illustrating one example of the functional configuration of service server 400 according to the present embodiment. As illustrated in FIG. 10, service server 400 includes service manager 411, transaction data generator 412, recorder 413, and communicator 414. Service server 400 can be implemented by a processor executing a predetermined program using a memory. The following describes structural elements.

<Service Manager 411>

Service manager 411 manages whether or not a predetermined contract has been formed between service server 400 and a device such as controller 1001 of home 100. For example, service manager 411 requests home 100 to save power in order to make adjustments such as a reduction in power usage in home 100 on the basis of power demand estimates or the like. Here, home 100 may reduce the use of grid power by providing excess electric power of one home to another home through power trading between the homes.

Furthermore, service manager 411 determines a power saving method together with controller 1001 of home 100, for example, and generates a list of information types indicating data that is related to a contract and is to be obtained from home 100 subject to recording in the distributed ledger in accordance with the contract information and the saving method.

Furthermore, service manager 411 generates a smart contract for sending the information type list to home 100 that has agreed to a predetermined contract such as power saving, for example, when there is a response from said home 100. Note that the smart contract may include contract information indicating the content, etc., of the predetermined contract and a list of information types indicating data related to the predetermined contract. In this case, a function including the contract information and the information type list is defined in the smart contract.

Furthermore, service manager 411 may generate a smart contract stipulating that, for example, when home 100 that has agreed to the predetermined contract transmits transaction data including the data related to the contract to authentication server 200 and the transaction data is recorded in the distributed ledger, an incentive is to be paid to home 100.

Service manager 411 transmits the generated smart contract to transaction data generator 412 and records the generated smart contract in recorder 413.

Note that when there is a response from home 100 that has agreed to the predetermined contract such as power saving, service manager 411 may send the information type list to said home 100.

<Transaction Data Generator 412>

When transaction data generator 412 receives the smart contract from service manager 411, transaction data generator 412 generates transaction data including the received smart contract. Transaction data generator 412 transmits the generated transaction data to authentication server 200.

<Recorder 413>

Recorder 413 records the information type list and the smart contract generated by service manager 411. Note that recorder 413 may record contract information indicating the content, etc., of a predetermined contract which service manager 411 manages or may record a power adjustment method determined by service manager 411.

<Communicator 414>

Communicator 414 communicates with home 100, authentication server 200, and data server 300 via communication network 500. This communication may be performed using TLS.

In this case, a cryptographic key for TLS communication may be held in communicator 414.

More specifically, communicator 414 transmits, to first authentication server 200, the second transaction data including the smart contract for confirming formation of a contract between service server 400 and the device.

1.7 Overall Sequence Between Home, Authentication Servers, Data Server, and Service Server Next, a sequence of data management between home 100a, authentication servers 200a to 200c, data server 300, and service server 400 will be described.

Figure 9:
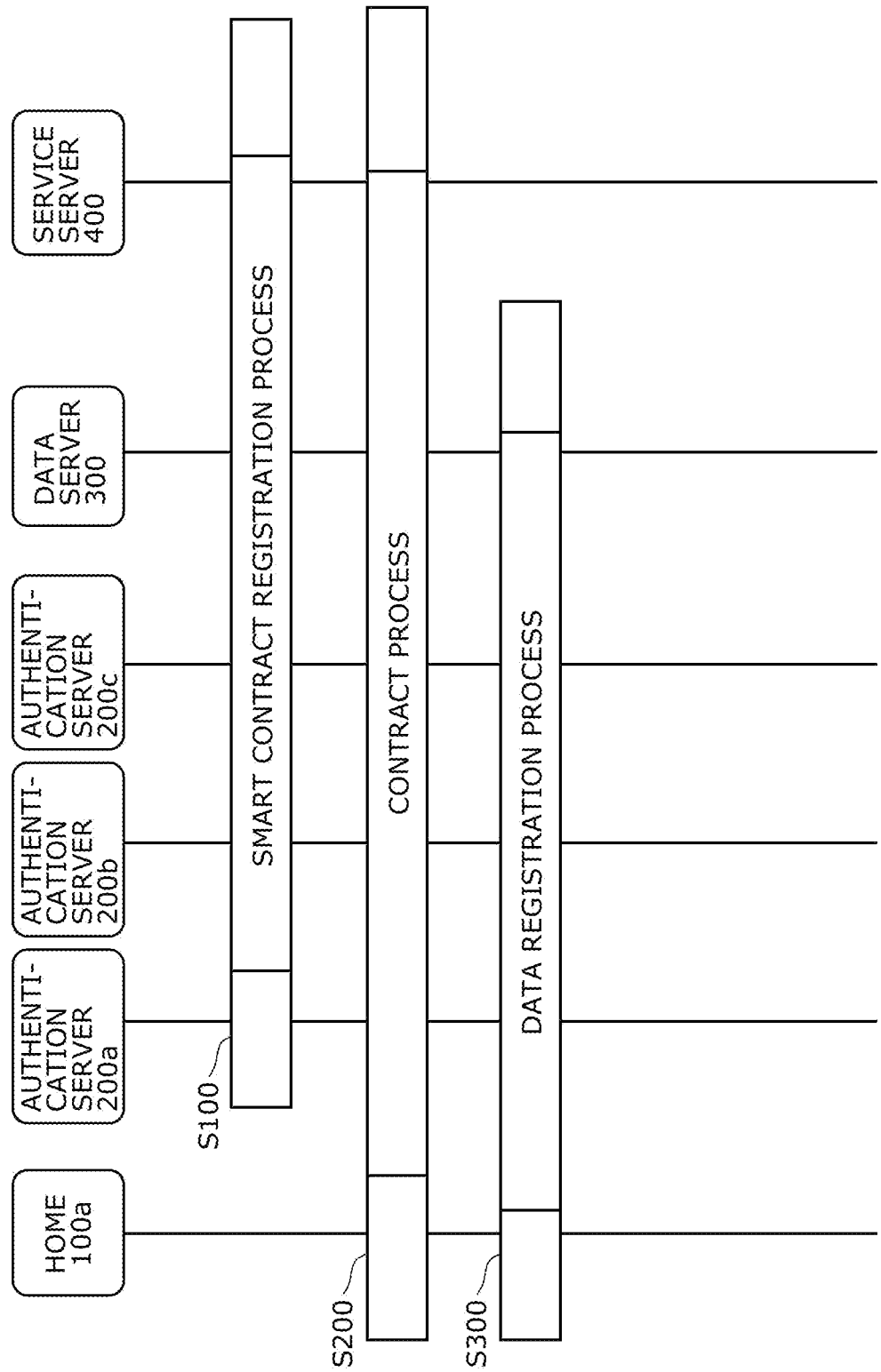
FIG. 9 is a diagram illustrating the overall sequence between a home, authentication servers, a data server, and a service server according to an embodiment.

FIG. 9 is a diagram illustrating the overall sequence between home 100a, authentication servers 200a to 200c, data server 300, and service server 400 according to the present embodiment. Note that home 100a illustrated in FIG. 9 may be home 100b or 100c.

First, in Step S100, a smart contract registration process is performed between authentication servers 200a, 200b, 200c and service server 400. Next, in Step S200, a contract process is performed between home 100, authentication servers 200a, 200b, 200c and service server 400. Next, in Step S300, a data registration process is performed between home 100, authentication servers 200a, 200b, 200c and data server 300.

Hereinafter, the processes in Step S100 to Step S300 will be described in detail.

1.7.1 Smart Contract Registration Process

Next, the smart contract registration process between authentication servers 200a, 200b, 200c and service server 400 will be described in detail.

FIG. 10 is a sequence chart for describing the details of the smart contract registration process indicated in Step S100 in FIG. 9. In FIG. 10, service server 400 is described as registering the smart contract with authentication server 200c, but this is not limiting. Service server 400 may also register the smart contract with other authentication servers 200a, 200b, which results in substantially the same process.

First, service server 400 generates a smart contract (S101). Here, service server 400 generates a smart contract which is a program for sending the information type list to home 100a or the like that has agreed to a predetermined contract such as power saving when there is a response from home 100a or the like. In this case, for example, service server 400 may generate a smart contract that defines a function including contract information indicating the content of power saving as the content of the predetermined contract and a list of information types indicating data related to power saving as the predetermined contract.

Note that service server 400 may generate a smart contract stipulating that when home 100a or the like that has agreed to a predetermined contract transmits transaction data including data related to the contract to authentication server 200a or the like and the transaction data is recorded in the distributed ledger, an incentive is to be paid to home 100a.

Next, service server 400 generates transaction data (hereinafter referred to as the second transaction data) including the smart contract generated in Step S101 and transmits the transaction data to authentication server 200c (S102).

Next, authentication server 200c verifies the second transaction data received from service server 400 (S103). Note that Step S103 may be skipped.

When the verification of the second transaction data is not successful in Step S103 (N in S103), authentication server 200c sends a notification to that effect to service server 400 (S104) and ends the smart contract registration process.

In contrast, when the verification of the second transaction data is successful in Step S103 (Y in S103), authentication server 200c transfers the second transaction data to other authentication servers 200a, 200b (S105). Note that when Step S103 is skipped, it is sufficient that authentication server 200c transfer, to other authentication servers 200a, 200b, the second transaction data received from service server 400. Furthermore, other authentication servers 200a, 200b verify the transferred and received second transaction data in substantially the same manner.

Next, authentication server 200a, authentication server 200b, and authentication server 200c execute the consensus algorithm (S106). When authentication server 200a, authentication server 200b, and authentication server 200c verify that the received second transaction data is valid transaction data (in other words, validity), each of authentication server 200a, authentication server 200b, and authentication server 200c generates a block including the second transaction data. Subsequently, authentication servers 200a, 200b, 200c record the blocks including the second transaction data in the distributed ledger of storage devices 201a, 201b, 201c. In this manner, the smart contract generated by service server 400 is registered (recorded) in the distributed ledger. The registered smart contract is executed after the transaction data received from home 100a or the like and including the contract address of said smart contract is recorded in the distributed ledger.

Note that in the case where the predetermined contract has been formed between home 100a and service server 400, the smart contract may include a program for recording the identifier (for example, the blockchain address) of a home with which the contract has been formed.

1.7.2 Contract Process

Next, the contract process between home 100a, authentication servers 200a, 200b, 200c, and service server 400 will be described in detail. The following describes, as an example, a contract process in which a contract related to electric power whose contract type is power saving (one of the predetermined contracts mentioned above) is formed between service server 400 and home 100a and a new information type list indicating data related to the contract is transmitted to home 100a.

Figure 11:
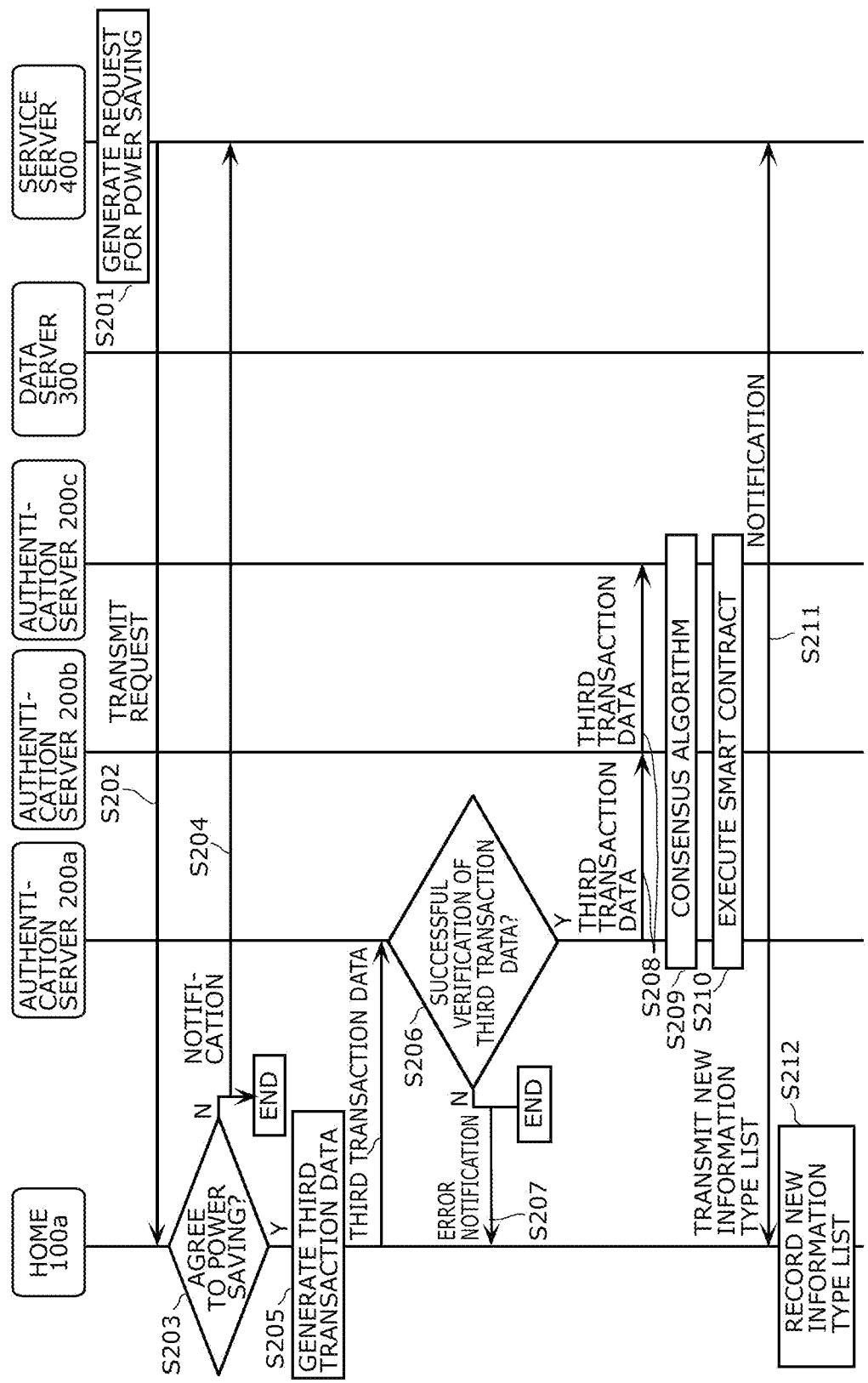
FIG. 11 is a sequence chart for describing details of a contract process indicated in Step S200 in FIG. 9.

FIG. 11 is a sequence chart for describing the details of the contract process indicated in Step S200 in FIG. 9.

First, service server 400 determines that power saving is necessary, and generates a request for power saving (S201).

Specifically, service server 400 requests each home (homes 100a, 100b, 100c) to save power.

Next, service server 400 transmits the generated request for power saving to each home (homes 100a, 100b, 100c) (S202).

Next, each home receives the request for power saving from service server 400 and determines whether or not to agree to power saving (S203). At this time, in each home, controller 1001 may prompt a user to determine, through display, whether or not to agree to the request for power saving or may determine, according to the amount of electric power stored in storage battery 1003, which is an in-home device, whether or not to agree to the request for power saving.

For example, when home 100a determines not to agree to power saving in Step S203 (N in S203), home 100a sends a notification to that effect to service server 400 (S204), and the contract process is ended.

In contrast, for example, when home 100a determines to agree to power saving in Step S203 (Y in S203), home 100a generates transaction data (hereinafter referred to as the third transaction data) (S205). Here, the third transaction data includes information indicating the formation of the contract between service server 400 and home 100a (controller 1001 of home 100a), such as information indicating the intention of agreeing to the request for power saving that has been received from service server 400. Subsequently, home 100a transmits the generated third transaction data to authentication server 200a. Although home 100a is described as transmitting the third transaction data to authentication server 200a, this is not limiting. Home 100a may also transmit the third transaction data to other authentication servers 200b, 200c, resulting in substantially the same process. Furthermore, although not illustrated in the drawings, home 100a may send, to service server 400, a notification of agreement to the request for power saving that has been received from service server 400.

Next, authentication server 200a verifies the third transaction data received from home 100a (S206). Note that Step S206 may be skipped.

When the verification of the third transaction data is not successful in Step S206 (N in S206), authentication server 200a sends a notification to that effect to home 100a (S207) and ends the contract process.

In contrast, when the verification of the third transaction data is successful in Step S206 (Y in S206), authentication server 200a transfers the third transaction data to other authentication servers 200b, 200c (S208). Note that when Step S206 is skipped, it is sufficient that authentication server 200a transfer, to other authentication servers 200b, 200c, the third transaction data received from home 100a. Furthermore, other authentication servers 200b, 200c verify the transferred and received third transaction data in substantially the same manner.

Next, authentication server 200a, authentication server 200b, and authentication server 200c execute the consensus algorithm (S209). When authentication server 200a, authentication server 200b, and authentication server 200c verify that the received third transaction data is valid transaction data (in other words, validity), each of authentication server 200a, authentication server 200b, and authentication server 200c generates a block including the third transaction data. Subsequently, authentication servers 200a, 200b, 200c record the blocks including the third transaction data in the distributed ledger of storage devices 201a, 201b, 201c. In this manner, agreement by home 100a to a predetermined contract such as the request for power saving (in other words, formation of a contract) is recorded in the distributed ledger, that is, the blockchain.

Next, authentication server 200a, authentication server 200b, and authentication server 200c execute the smart contract on the basis of the third transaction data recorded in the distributed ledger (S210).

Next, the executed smart contract notifies service server 400 of home 100a that has agreed to the request for power saving and transmits, to home 100a, a new information type list indicating data related to the power saving contract (S211).

Next, when home 100a receives the information type list transmitted in Step S211, home 100a records the received new information type list (S212).

In this manner, every time a predetermined contract is formed between home 100a and service server 400, home 100a can receive a new information type list which is a data list indicating data related to the predetermined contract that has been formed, and add the new information type list to the information type list that has already been held.

1.7.3 Data Registration Process

Next, the data registration process between home 100a, authentication servers 200a, 200b, 200c, and data server 300 will be described in detail.

Figure 12:
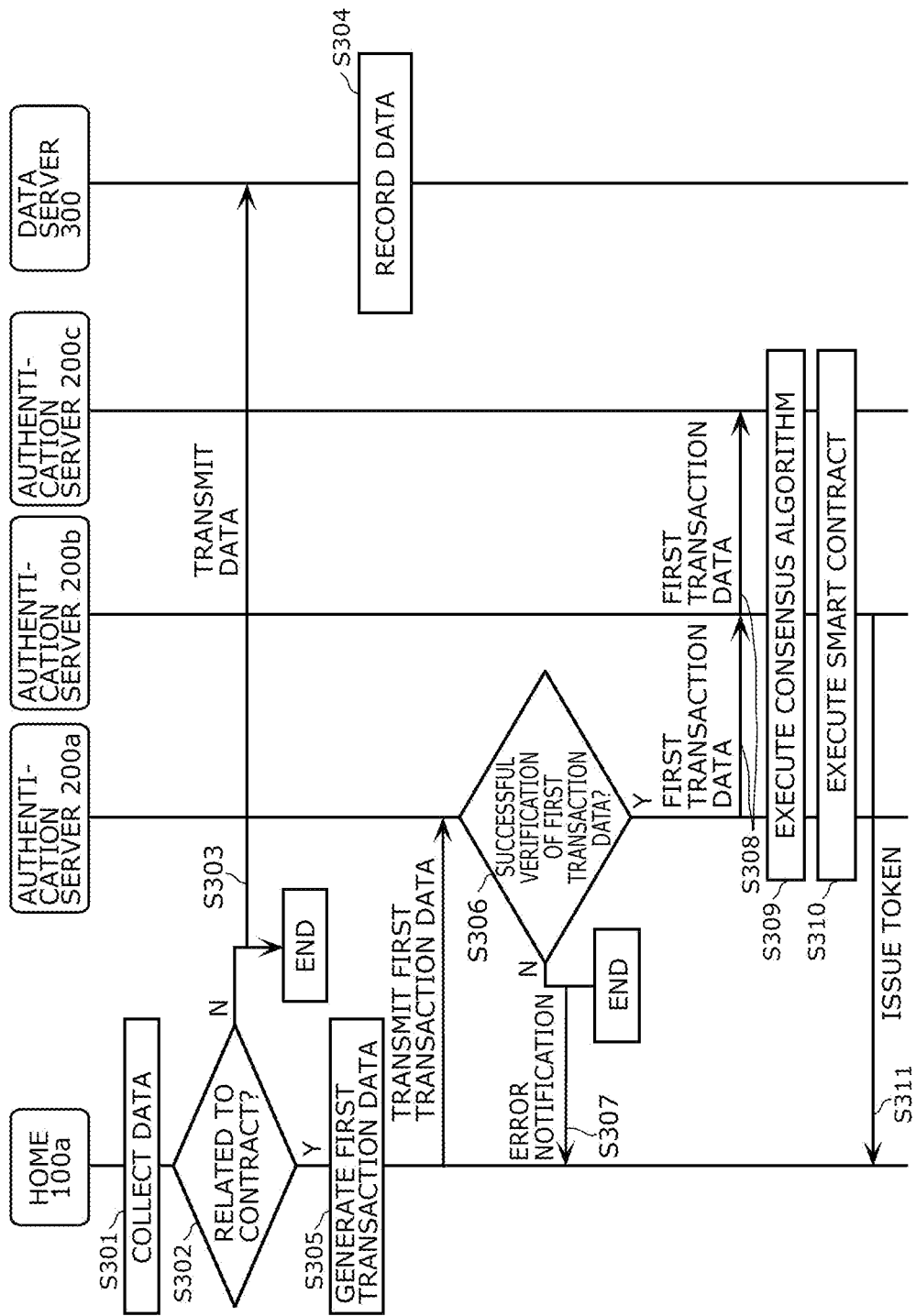
FIG. 12 is a sequence chart for describing details of a data registration process indicated in Step S300 in FIG. 9.

FIG. 12 is a sequence chart for describing the details of the data registration process indicated in Step S300 in FIG. 9. In FIG. 12, home 100a is described as transmitting the data generated by the in-home device, but this is not limiting. Other homes 100b, 100c may transmit the data generated by the in-home device, which is substantially the same process.

First, in home 100a, the data generated by the in-home device and history information including operation information of the in-home device are collected (S301). In the present embodiment, for example, controller 1001 collects data such as the power information generated by the power meter, the amount of photovoltaic power, the history information of the in-home device operated by controller 1001, and sensor data of the in-home device.

Next, with reference to the information type list, home 100a (controller 1001 thereof) determines whether or not the collected data is information related to the contract (S302).

When home 100a determines, in Step 302, that the collected data is not data related to the contract (hereinafter referred to as the device data) indicated in the information type list (N in S302), home 100a transmits the collected data to data server 300 (S303). Subsequently, data server 300 records the data received from home 100a (S304).

When home 100a determines, in Step S302, that the collected data is the device data indicated in the information type list (Y in S302), home 100a generates transaction data including the collected data (hereinafter referred to as the first transaction data) (S305) and transmits the transaction data to authentication server 200a. Although home 100a is described as transmitting the first transaction data to authentication server 200a, this is not limiting. Home 100a may also transmit the first transaction data to other authentication servers 200b, 200c, resulting in substantially the same process. Furthermore, home 100a may transmit the first transaction data to authentication server 200a and also transmit the first transaction data to data server 300.

Next, authentication server 200a verifies the first transaction data received from home 100a (S306). Note that Step S306 may be skipped.

When the verification of the first transaction data is not successful in Step S306 (N in S306), authentication server 200a sends a notification to that effect, that is, an error notification, to home 100a (S307) and ends the data registration process.

In contrast, when the verification of the first transaction data is successful in Step S306 (Y in S306), authentication server 200a transfers the first transaction data to other authentication servers 200b, 200c (S308). Note that when Step S306 is skipped, it is sufficient that authentication server 200a transfer, to other authentication servers 200b, 200c, the first transaction data received from home 100a. Furthermore, other authentication servers 200b, 200c verify the transferred and received first transaction data in substantially the same manner.

Next, authentication server 200a, authentication server 200b, and authentication server 200c execute the consensus algorithm (S309). When authentication server 200a, authentication server 200b, and authentication server 200c verify that the received first transaction data is valid transaction data (in other words, validity), each of authentication server 200a, authentication server 200b, and authentication server 200c generates a block including the first transaction data. Subsequently, authentication servers 200a, 200b, 200c record the blocks including the first transaction data in the distributed ledger of storage devices 201a, 201b, 201c. In this manner, the device data related to the predetermined contract is recorded in the distributed ledger, that is, the blockchain.

Next, authentication server 200a, authentication server 200b, and authentication server 200c execute the smart contract on the basis of the first transaction data recorded in the distributed ledger (S310).

Next, the executed smart contract issues a token for paying an incentive to home 100a that has generated the first transaction data recorded in the distributed ledger (S311).

1.8 Advantageous Effects, Etc

According to the above embodiment, out of the collected data, only the data related to the contract is recorded in the distributed ledger as necessary data, and thus it is possible to manage only the necessary data using the blockchain technology. With this, it is possible to prevent the necessary data from being tampered with. Furthermore, since only the necessary data can be managed using the blockchain technology, it is possible to save space in the distributed ledger, meaning that the resource required for management under the blockchain technology can be minimized. This makes it possible to construct a data management system that is safe and efficient for data utilization.

Furthermore, according to the above embodiment, when transaction data indicating formation of a contract between service server 400 and home 100a or the like is generated and recorded in the distributed ledger, the smart contract is executed and the information type list is added. With this, it is possible to not only guarantee the formation of the contract between home 100a or the like and service server 400, but also more reliably record the data related to the formed contract in the distributed ledger.

Note that according to the above embodiment, data not related to the contract is recorded in data server 300. This keeps the transaction data in the blockchain from becoming enormous, and thus allows a reduction in the time required to generate a block, enabling an improvement of real-time data utilization.

2. Other Variations

Although the present disclosure has been thus far described based on the above embodiment, it goes without saying that the present disclosure is not limited to the above embodiment. The following cases are also included in the present disclosure.

(1) In the above embodiment, authentication server 200 and data server 300 are described as separate devices, but this is not limiting. Authentication server 200 and data server 300 may be the same device. In this case, it is sufficient that authentication server 200 generate a block of the blockchain by including therein only information related to a contract.

(2) In the above embodiment, controller 1001 of home 100 determines, with reference to the information type list, whether or not the obtained or generated data is information about a contract, but this is not limiting. The authentication server may determine, with reference to the information type list, whether or not the data received from controller 1001 of home 100 is information about a contract.

This case will be described below with reference to the drawings.

Figure 13:
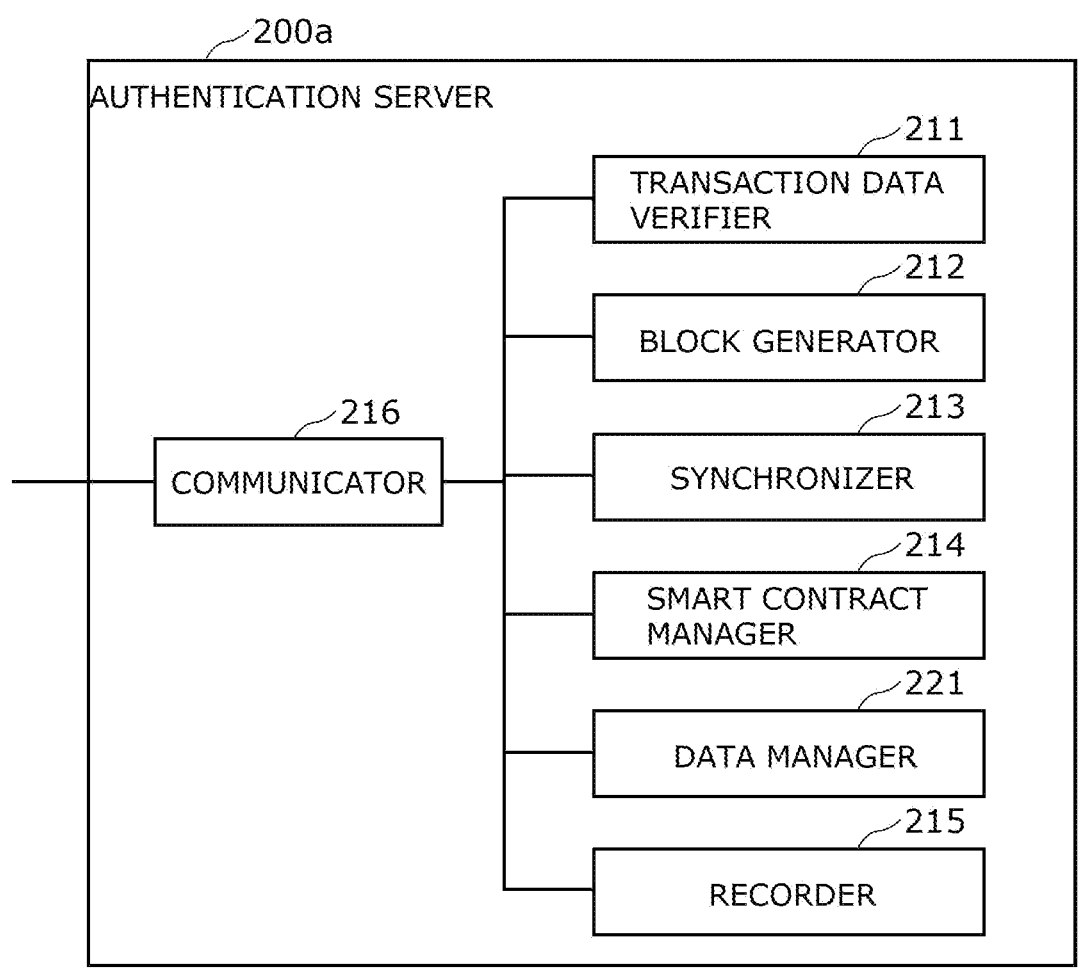
FIG. 13 is a block diagram illustrating one example of the functional configuration of an authentication server according to a variation of an embodiment.

FIG. 13 is a block diagram illustrating one example of the functional configuration of authentication server 200a according to a variation of the present embodiment. Elements substantially the same as those in authentication server 200a illustrated in FIG. 5 are assigned the same reference signs, and detailed description thereof is omitted.

Authentication server 200a illustrated in FIG. 13 is different from authentication server 200a illustrated in FIG. 5 in that data manager 221 is additionally included.

Data manager 221 determines, with reference to the information type list, whether or not the device data included in the first transaction data obtained via communicator 216 is the first data indicated in the information type list.

More specifically, data manager 221 obtains the information type list from service server 400. Data manager 221 determines whether or not data obtained or generated by a device such as controller 1001 of home 100 and included in the first transaction data received from home 100 is the first data, which is, for example, information about a contract, indicated in the information type list.

When data manager 221 determines that the data received from home 100 is the first data such as the information about the contract, data manager 221 transmits the first transaction data to transaction data verifier 211 and causes transaction data verifier 211 to verify the first transaction data. In other words, when data manager 221 determines that the device data included in the first transaction data is the first data indicated in the information type list, transaction data verifier 211 verifies the first transaction data.

When data manager 221 determines that the data received from home 100 is not the first data, such as the information about the contract, indicated in the information type list, data manager 221 transmits, to data server 300, the data received from home 100. Thus, data manager 221 can cause data server 300 to record, in storage device 301, the data transmitted by data manager 221.

Note that in the present variation, home 100a includes, in the first transaction data, the data obtained or generated by a device such as controller 1001, and transmits the first transaction data to authentication server 200a. In this manner, whether or not the data is subject to recording in the distributed ledger is not determined on the home 100a side, but is determined on the authentication server 200a side, and thus only the data related to the contract is recorded in the distributed ledger as necessary data.

FIG. 14 is a sequence chart for describing an example according to the present variation of details of the data registration process indicated in Step S300 in FIG. 9. In FIG. 14, home 100a is described as transmitting data generated by the in-home device, but this is not limiting. Other homes 100b, 100c may transmit the data generated by the in-home device, which is substantially the same process.

First, in home 100a, the data generated by the in-home device and history information including operation information of the in-home device are collected (S321). Similarly to the case described above, for example, controller 1001 collects data such as the power information generated by the power meter, the amount of photovoltaic power, the history information of the in-home device operated by controller 1001, and sensor data of the in-home device.

Next, home 100a (controller 1001 thereof) generates transaction data (hereinafter referred to as the first transaction data) including the collected data (S322). Here, the first transaction data is described as individually including the collected data.

Next, home 100a transmits, to authentication server 200a, the first transaction data generated in Step S322 (S323).

Next, when authentication server 200a receives the first transaction data from home 100a, authentications server 200a determines, with reference to the information type list, whether or not the data included in the received first transaction data is information related to a contract (S324).

When authentication server 200a determines, in Step S324, that the data included in the first transaction data received from home 100a is not the information related to the contract (N in S324), authentication server 200a transmits, to data server 300, the data included in the first transaction data (S325). Subsequently, data server 300 records the data received from authentication server 200a (S326).

In contrast, when authentication server 200a determines, in Step S324, that the data included in the first transaction data received from home 100a is the information related to the contract (Y in S324), authentication server 200a verifies the first transaction data received from home 100a (S327).

When the verification of the first transaction data is not successful in Step S327 (N in S327), authentication server 200a sends a notification to that effect, that is, an error notification, to home 100a (S328) and ends the data registration process.

In contrast, when the verification of the first transaction data is successful in Step S327 (Y in S327), authentication server 200a transfers the first transaction data to other authentication servers 200b, 200c (S329). Note that other authentication servers 200b, 200c verify the transferred and received first transaction data in substantially the same manner. Furthermore, authentication server 200a may also transfer the first transaction data to data server 300. In this case, data server 300 records the received first transaction data or the data included in the first transaction data.

Next, authentication server 200a, authentication server 200b, and authentication server 200c execute the consensus algorithm (S330). When authentication server 200a, authentication server 200b, and authentication server 200c verify that the received first transaction data is valid transaction data (in other words, validity), each of authentication server 200a, authentication server 200b, and authentication server 200c generates a block including the first transaction data.

Subsequently, authentication servers 200a, 200b, 200c record the blocks including the first transaction data in the distributed ledger of storage devices 201a, 201b, 201c.

In this manner, authentication server 200a can record, out of the data obtained from home 100, only the device data related to the predetermined contract in the distributed ledger, that is, the blockchain, and thus whether or not the data is the information related to the contract no longer needs to be determined on the home 100 side.

(3) The above embodiment describes, as an example, the case where service server 400 and home 100 form a power saving contract as the predetermined contract, but this is not limiting. The predetermined contract may be a power trading contract that is of a contract type indicated in the information type list illustrated in FIG. 4 or may be a contract of linkage between IoT devices that is not illustrated in FIG. 4.

First, the case of forming a power trading contract as the predetermined contract will be described. In the smart contract registration process illustrated in FIG. 10, service server 400 generates a smart contract for a power trading contract in Step S101. For example, service server 400 generates a smart contract that defines variables of a home that sells electric power and a home that buys the electric power, as contract information indicating the content of power trading, and defines a function including the variables and a list of information types indicating information of power meters of the homes that have formed the contract, as data related to power trading. Subsequently, service server 400 transmits the generated smart contract to authentication server 200 and thereby causes the generated smart contract to be recorded in the distributed ledger of authentication server 200.

In the contract process illustrated in FIG. 11, home 100 that has agreed to power trading in Step S203 transmits, to authentication server 200, transaction data for selling or buying electric power that has been generated in Step S205. When authentication server 200 records the obtained transaction data for selling or buying electric power in the distributed ledger, authentication server 200 executes the smart contract and checks whether home 100 that sells electric power and home 100 that buys the electric power have sufficient electric power. For example, authentication server 200 obtains, from home 100 that buys electric power, transaction data indicating that 10 kilowatt hours (kWh) of electric power is necessary, obtains, from one or more homes 100 that sell electric power, transaction data indicating that a certain amount of electric power can be sold, records the transaction data in the distributed ledger, and executes the smart contract. Authentication server 200 executes the smart contract, checks whether home 100 that sells electric power and home 100 that buys the electric power have sufficient electric power, and when the total amount of electric power that can be sold by the one or more homes 100 that sell electric power exceeds 10 kWh, determines that a contract has been formed. Subsequently, the smart contract transmits, to each of homes 100 that have formed the contract, an information type list indicating data related to the power trading contract.

In the data registration process illustrated in FIG. 12, homes 100 that have formed the contract generate transaction data including information of the power meters and transmit the transaction data to authentication server 200.

In this manner, only the data related to the power trading contract can be recorded in the distributed ledger and managed as necessary data. Thus, selling or buying of electric power is guaranteed with the blockchain.

Next, the case of forming a contract of linkage between IoT devices as the predetermined contract will be described. In the smart contract registration process illustrated in FIG. 10, service server 400 generates a smart contract for a contract of device linkage in Step S101.

For example, service server 400 generates a smart contract that defines devices to be linked, as contract information indicating the content of device linkage, and defines a function including the devices to be linked and a list of information types indicating the state of each of the devices to be linked, as data related to device linkage. Furthermore, in the case where the devices to be linked are device A and device B, service server 400 further defines, in the smart contract, a function for checking the state of device B after completion of the operations of device A. As an example, service server 400 sets device A as a lock to a room and sets device B as a lighting fixture in the room, and generates a smart contract in which, when transaction data indicating that the lock which is device A has been locked is recorded in the distributed ledger, the state of the lighting fixture which is device B is to be checked. Subsequently, service server 400 transmits the generated smart contract to authentication server 200 and thereby causes the generated smart contract to be recorded in the distributed ledger of authentication server 200.

In the contract process illustrated in FIG. 11, when home 100 agrees to the contract of device linkage in Step S203, transaction data indicating that home 100 has agreed to the contract of device linkage may be generated in Step S205. Furthermore, transaction data indicating that device A and device B have been linked as a result of controller 1001 of said home 100 associating device A and device B with each other may be generated in Step S205. This results in generation of transaction data indicating that there is an agreement to the contract of device linkage in which locking of the lock denoted as device A and checking of the state of the lighting fixture denoted as device B are associated with each other, for example.

In the data registration process illustrated in FIG. 12, home 100 that has agreed to the contract of device linkage generates transaction data indicating the operation state of device A and transaction data indicating the operation state of device B, and transmits the transaction data to authentication server 200. When the transaction data indicating the operation state of device A is recorded in the distributed ledger, authentication server 200 executes the smart contract, checks the transaction data including the state of device B, and obtains status information of device B that has been checked. Authentication server 200 generates transaction data including the status information of device B that has been obtained by executing the smart contract, and records the transaction data in the distributed ledger.

In this manner, as the data related to the contract of device linkage, out of the states of devices that have operated in conjunction, only the latter state can be recorded in the distributed ledger and managed as necessary data. Thus, the information of device linkage is guaranteed with the blockchain.

Examples of devices subject to device linkage may include a room lock and room lighting and may also include a robot. For example, as robot linkage, robot device A and robot device B deliver a package in conjunction. In this case, when transaction data indicating the state of robot device A is recorded in the distributed ledger, the smart contract may be executed to check the state of robot device B and obtain status information of robot device B that has been checked. Subsequently, authentication server 200 generates transaction data including the status information of robot device B that has been obtained by executing the smart contract, and records the transaction data in the distributed ledger. With this, whether or not the robot linkage operates properly and the package has been successfully received can be checked with the distributed ledger. Examples of the status information of the robot devices may include the identifier of the package and the sensor information of the package upon delivery. Note that the status information of the robot devices such as the sensor information may be transmitted to the data server while not in delivery operations.

Furthermore, as checking of the robot linkage, when the transaction data indicating the state of the robot device in the upstream process is recorded in the distributed ledger, the smart contract may be executed to check the state of the robot device in the downstream process and obtain the checked status information. Subsequently, authentication server 200 generates transaction data including the status information of the robot device in the downstream process that has been obtained by executing the smart contract, and records the transaction data in the distributed ledger. With this, whether or not the robot linkage is operating properly can be checked.

Note that the smart contract is a program to be recorded in the distributed ledger and is executed on the basis of the contract address included in the transaction data recorded in the distributed ledger, and thus is defined as not generating transaction data, but this is not limiting. The smart contract may generate transaction data including data obtained as a result of execution.

(4) In the above embodiment, authentication server 200 uses one blockchain to manage the data related to the contract included in the first transaction data, but this is not limiting. Authentication server 200 may divide the blockchain into blockchains for respective contracts and manage the data related to the contracts with the blockchains. For example, the blockchain may be divided for the device data related to power saving and the device data related to power trading.

(5) The above embodiment describes authentication server 200 or home 100 as holding one information type list including information of all the contract types subject to recording in the distributed ledger, but this is not limiting. Authentication server 200 or home 100 may hold one information type list for each contract type.

(6) In the above embodiment, service server 400 transmits a service request such as a request for power saving to home 100 or the like, but this is not limiting. Service server 400 may generate transaction data indicating the service request and transmit the transaction data to authentication server 200. In this case, it is sufficient that home 100 perform a polling operation or the like on authentication server 200 and check whether or not the transaction data indicating the service request is present in authentication server 200.

Furthermore, service server 400 may generate transaction data including a smart contract for making a service request and transmit the transaction data to authentication server 200. In this case, when the transaction data for making a service request from service server 400 is included in a block of the blockchain and recorded, authentication server 200 may execute the smart contract for making the service request and cause the service request to be transmitted to each home 100.

(7) In the above embodiment, when home 100 agrees to a service request such as a request for power saving, home 100 generates the third transaction data and transmits the third transaction data to authentication server 200, but this is not limiting. Home 100 may not only generate the third transaction data and transmit the third transaction data to authentication server 200, but also send, to service server 400, a notification of agreement to the service request.

(8) In the above embodiment, the smart contract is executed to update the information type list held by home 100, but this is not limiting. The execution of the smart contract may be skipped. In this case, when the recorded information type list is updated, data server 300 may send, to home 100 that has agreed to the service request, a notification indicating that the information type list has been updated.

Furthermore, when service server 400 updates the information type list, the information type list held by authentication server 200 may be updated. In the case where authentication server 200 manages the information type list by recording the information type list in the blockchain, the updated information type list may be recorded in the blockchain.

(9) In the above embodiment, when home 100 agrees to a contract such as a request for power saving, home 100 refers to the information type list, generates the first transaction data including the first data related to the contract, and transmits the first transaction data to authentication server 200, but this is not limiting. When a device such as controller 1001 of home 100 determines, according to a predetermined criterion, that data other than the first data is preferably recorded in the distributed ledger, the device may generate transaction data including data other than the first data and transmit the transaction data to authentication server 200. For example, when two or more devices operate in conjunction, a device such as controller 1001 of home 100 may generate transaction data including data related to the operation in conjunction, instead of the first data related to the contract, and transmit the transaction data to authentication server 200.

(10) Each device in the above embodiment may be specifically a computer system made up of a microprocessor, read only memory (ROM), a solid-state drive (SSD), random access memory (RAM), a hard disk unit, a display unit, a keyboard, a mouse, and so on. A computer program is recorded in the RAM or the hard disk unit. Each device achieves its functions by way of the microprocessor operating according to the computer program. Here, the computer program is configured of a combination of a plurality of command codes indicating instructions to a computer in order to achieve a predetermined function.

(11) Some or all of the structural elements included in each device in the above embodiment may be one system LSI (Large Scale Integration: large scale integrated circuit). The system LSI is a super multifunctional LSI manufactured by integrating a plurality of components onto a single chip. Specifically, the system LSI is a computer system configured of a microprocessor, ROM, RAM, and so on. A computer program is recorded in the RAM. The system LSI achieves its function by way of the microprocessor operating according to the computer program.

Furthermore, each unit of the structural elements included in each device described above may be individually configured into single chips, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(12) Some or all of the structural elements included in each device described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(13) The present invention may be the above-described methods. Furthermore, the present invention may be a computer program for implementing these methods using a computer or may be a digital signal of the computer program.

Furthermore, the present disclosure may be a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may have the computer program recorded therein, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(14) The above embodiment and the above variations may be combined with each other.

INDUSTRIAL APPLICABILITY

The present disclosure is applicable to a data management method, a data management system, and a program; for example, by using blockchains to manage only data that requires assurance, the present disclosure is applicable to a data management method, a data management system, and a program that are used for safe, tamper-proof systems.

The invention claimed is:

1. A data management method performed by a first authentication server included in a plurality of authentication servers in a data management system including the plurality of authentication servers and a device, each of the plurality of authentication servers having a distributed ledger, the data management method comprising:

obtaining first transaction data generated by the device, the first transaction data including device data obtained or generated by the device; and generating a block including the first transaction data and recording, in the distributed ledger, the block generated, when the device data included in the first transaction data is first data indicated in an information type list which is a data list indicating data that is subject to recording in the distributed ledger and related to a predetermined contract, wherein the predetermined contract is a contract related to electric power or a contract related to linkage between IoT devices, and the device data is data related to electric power or data related to linkage between IoT devices.

2. The data management method according to claim 1, wherein the first authentication server includes the information type list, the data management method further comprises:

determining, with reference to the information type list, whether or not the device data included in the first transaction data obtained in the obtaining is the first data indicated in the information type list, and in the generating of the block, when the device data included in the first transaction data is determined in the determining as being the first data indicated in the information type list, the block including the first transaction data is generated.

3. The data management method according to claim 2, wherein the data management system further includes a data server, and the data management method further comprises:

transmitting the device data to the data server to cause the data server to record the device data in a recording device included in the data server, when the device data included in the first transaction data is determined in the determining as not being the first data indicated in the information type list.

4. The data management method according to claim 3, wherein the data management system further includes a service server, the data management method further comprises:

generating, by the service server, a smart contract for confirming formation of a contract between the service server and the device, including the smart contract into second transaction data, and transmitting the second transaction data from the service server to the first authentication server, and in the generating of the block, a block including the second transaction data transmitted in the generating of the smart contract is generated, and the block generated is recorded in the distributed ledger.

5. The data management method according to claim 4, wherein in the obtaining, third transaction data generated by the device is obtained, the third transaction data indicating the formation of the contract between the service server and the device, in the generating of the block, a block including the third transaction data obtained in the obtaining is generated, and the block generated is recorded in the distributed ledger, and the data management method further comprises:
adding data related to the contract formed between the service server and the device to the information type list by operating the smart contract based on the third transaction data included in the block recorded in the distributed ledger.

6. The data management method according to claim 4, further comprising:
issuing a token to the device by operating the smart contract based on the first transaction data, when the block including the first transaction data is recorded in the distributed ledger in the generating of the block.

7. The data management method according to claim 1, wherein
the device includes the information type list,
the data management method further comprises:
determining, by the device with reference to the information type list, whether or not the data obtained or generated by the device is the first data indicated in the information type list; and
generating the first transaction data to include, as the device data, the data obtained or generated by the device, and transmitting the first transaction data to the first authentication server, when the data obtained or generated by the device is determined in the determining by the device as being the first data indicated in the information type list, and
in the obtaining, the first transaction data transmitted in the generating of the first transaction data is obtained.

8. The data management method according to claim 7, wherein
the data management system further includes a data server, and
the data management method further comprises:
transmitting the data obtained or generated by the device to the data server by the device to cause the data server to record the data obtained or generated by the device in a recording device included in the data server, when the data obtained or generated by the device is determined by the device in the determining by the device as not being the first data indicated in the information type list.

9. The data management method according to claim 1, wherein
the predetermined contract is related to electric power, and
the device data is related to electric power.

10. The data management method according to claim 1, wherein
the predetermined contract is a contract related to linkage between a first device and a second device that are different from the device, and
the device data is data about a status of the second device after completion of an operation of the first device.

11. The data management method according to claim 10, wherein
the first device is a robot that operates in a first process, and
the second device is a robot that operates after the first process.

12. A data management system, comprising:
a plurality of authentication servers each having a distributed ledger; and
a device, wherein
a first authentication server included in the plurality of authentication servers includes:
an obtainer that obtains first transaction data generated by the device, the first transaction data including device data obtained or generated by the device;
a transaction data verifier that verifies the first transaction data when the device data included in the first transaction data is first data indicated in an information type list which is a data list indicating data that is subject to recording in the distributed ledger and related to a predetermined contract; and
a synchronizer that generates a block including the first transaction data and records, in the distributed ledger, the block generated;
the predetermined contract is a contract related to electric power or a contract related to linkage between IoT devices; and
the device data is data related to electric power or data related to linkage between IoT devices.

13. A non-transitory computer-readable recording medium having a program causing a computer to execute a data management method that is performed by a first authentication server included in a plurality of authentication servers in a data management system including the plurality of authentication servers and a device, each of the plurality of authentication servers having a distributed ledger, the program causing the computer to execute:
obtaining first transaction data generated by the device, the first transaction data including device data obtained or generated by the device; and
generating a block including the first transaction data and recording, in the distributed ledger, the block generated, when the device data included in the first transaction data is first data indicated in an information type list which is a data list indicating data that is subject to recording in the distributed ledger and related to a predetermined contract, wherein
the predetermined contract is a contract related to electric power or a contract related to linkage between IoT devices, and
the device data is data related to electric power or data related to linkage between IoT devices.

* * * * *